US012393951B2

United States Patent
Benkreira et al.

(10) Patent No.: US 12,393,951 B2
(45) Date of Patent: *Aug. 19, 2025

(54) METHODS FOR ENHANCING TRANSACTION AUTHORIZATIONS WITH DEVICE LOCATION DATA

(71) Applicant: Capital One Services, LLC, McLean, VA (US)

(72) Inventors: Abdelkader M'hamed Benkreira, Washington, DC (US); Joshua Edwards, Philadelphia, PA (US); Adam Vukich, Alexandria, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/594,850

(22) Filed: Mar. 4, 2024

(65) Prior Publication Data

US 2024/0211953 A1   Jun. 27, 2024

Related U.S. Application Data

(62) Division of application No. 18/118,826, filed on Mar. 8, 2023, now Pat. No. 11,922,425, which is a division
(Continued)

(51) Int. Cl.
*G06Q 20/40* (2012.01)
*H04W 4/021* (2018.01)
*H04W 4/029* (2018.01)

(52) U.S. Cl.
CPC ........ *G06Q 20/4016* (2013.01); *H04W 4/021* (2013.01); *H04W 4/029* (2018.02); *G06Q 2240/00* (2013.01)

(58) Field of Classification Search
CPC .................................................. G07B 15/063
(Continued)

(56) References Cited

U.S. PATENT DOCUMENTS

| 2007/0008179 | A1* | 1/2007 | Hedley | G07B 15/00 |
| | | | | 340/928 |
| 2011/0090095 | A1* | 4/2011 | Goldmann | G08G 1/017 |
| | | | | 340/928 |
| 2018/0240098 | A1* | 8/2018 | You | G06Q 20/382 |

OTHER PUBLICATIONS

"Payments Fraud: Perception Versus Reality—A conference summary" Published by Federal Reserve Bank of Chicago (Year: 2009).*

* cited by examiner

*Primary Examiner* — Zeina Elchanti
(74) *Attorney, Agent, or Firm* — KDW Firm PLLC

(57) ABSTRACT

Various embodiments described herein are generally directed to techniques for managing fraud rules and generating authentication directions according to location data from one or more client devices. Embodiments may include using a payment server informed by a client device application to manage and/or apply fraud rules for transactions. In embodiments, fraud rules may be managed based on location data provided by a client device application and/or location data associated with at least one transaction system. In some embodiments, fraud rules may be managed based on location data provided by multiple client device applications and/or location data associated with at least one transaction system. In some embodiments, rules may be managed for an individual authorization request according to information from at least one client device application and location data for a transaction system associated with the authorization request.

20 Claims, 11 Drawing Sheets

Related U.S. Application Data of application No. 15/931,807, filed on May 14, 2020, now Pat. No. 11,605,084.

(58) Field of Classification Search
USPC .......................................................... 705/13
See application file for complete search history.

200

300

400A

400B

METHODS FOR ENHANCING TRANSACTION AUTHORIZATIONS WITH DEVICE LOCATION DATA

RELATED APPLICATIONS

This application is a divisional of U.S. patent application Ser. No. 18/118,826, filed on Mar. 8, 2023, now U.S. Pat. No. 11,922,425, which is a divisional of U.S. patent application Ser. No. 15/931,807, filed on May 14, 2020, now U.S. Pat. No. 11,604,084, all titled "METHODS FOR ENHANCING TRANSACTION AUTHORIZATIONS WITH DEVICE LOCATION DATA". The contents of the aforementioned applications are incorporated herein by reference in their entireties.

BACKGROUND

Perpetrators may engage in fraudulent transactions, such as using a stolen credit card to purchase goods. Fraud of this type is increasingly a significant risk for businesses, customers, and banks. To reduce fraud, some businesses apply rules to flag risky transactions. If the rules suggest that a purchase is unusual, it may be reviewed or denied. However, the goal of reducing fraud must be balanced against user convenience. For example, some techniques require that a registered user confirm a transaction if fraud is suspected. This method can ensure that the user indeed wishes to carry out the transaction, but it can also be disruptive. If the fraud rules are too stringent, the user may need to confirm many proper purchases. If they are too relaxed, some fraud may escape notice.

DETAILED DESCRIPTION

Figure 1:
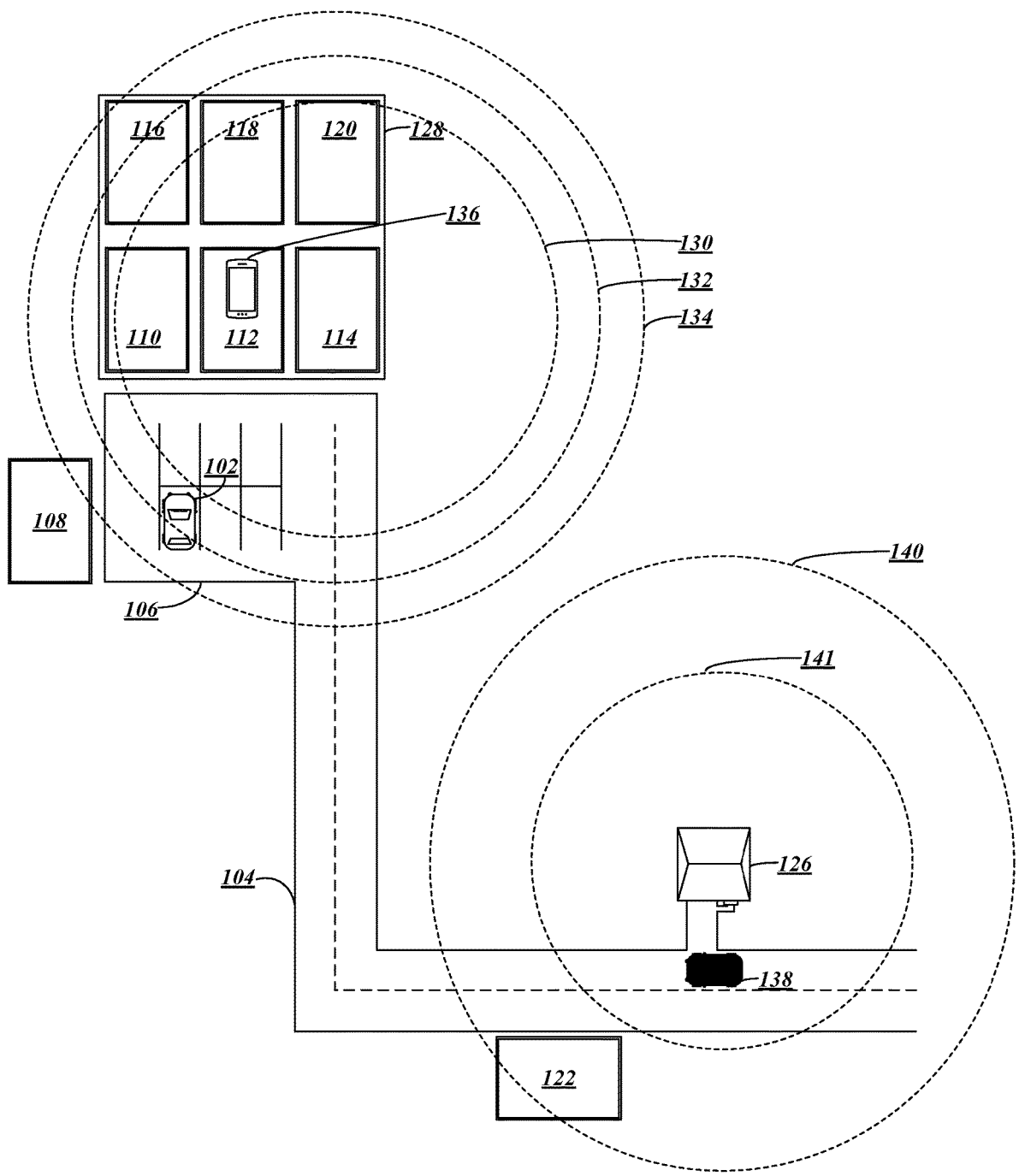
FIG. 1 depicts an exemplary environment suitable for use with exemplary embodiments.

In a world marked by an increasing emphasis on convenience, more customers than ever are opting to use payment cards over checks and cash for transactions. Payment cards, such as credit cards and debit cards, may offer customers conveniently carried methods to engage in transactions across vendors. For example, a customer may use the same credit card to pay for gas at a gas station in one town and for a television at an electronics store in a different town.

However, payment cards may present risks for customers, vendors, and financial institutions. A customer's possession of a payment card may not guarantee that they are authorized to use the payment card for a transaction. For example, a perpetrator may steal a payment card belonging to an authorized customer. Unauthorized transactions may present risks for authorized customers, vendors, and financial institutions. For example, a perpetrator may steal funds from a customer via an unauthorized transaction. In another example, a vendor may not receive funds for a product or service provided if a customer was not authorized to pay in a transaction. In yet another example, unauthorized transactions may jeopardize the security and/or reputation of financial institutions.

Payment systems may apply one or more fraud rules to attempt to verify that a customer is authorized to participate in a transaction with a payment card. Fraud rules may include conditions that may suggest that a transaction is typical or unusual. For example, one fraud rule may identify the geographical area that the authorized user associated with a payment card typically shops (e.g., within 500 miles of their home); if a transaction occurs outside this zone, fraud may be more likely. Similarly, the user may typically spend less than $500 in a given transaction; if their payment card is used in a transaction exceeding this amount it may be indicative of fraud.

These conditions may not necessarily signify fraud when taken in isolation (a user could be traveling or making an especially large purchase). However, the rules may be taken together or in various combinations to better understand whether a transaction is fraud or not. For example, a cumulative fraud score may be calculated based on the application of multiple different fraud rules.

Moreover, the fraud rules may be associated with different thresholds. For instance, in some circumstances, transactions greater than $1000 may be flagged. However, if other fraud rules indicate that fraud is possible (e.g., if the transaction occurs outside the user's typical geographical zone of use), this threshold may be decreased to $500.

If the fraud rules indicate that a transaction is legitimate, the transaction may be approved. On the other hand, if the fraud rules suggest that a transaction may be fraudulent, the transaction may be denied or may be escalated for review. For example, the user registered to the account associated with the payment card may be contacted via a messaging service, and the user may be asked to verify the transaction.

Different fraud rules may be more and/or less relaxed, strict, stringent convenient, or inconvenient. Strictness and/or convenience of a rule may be measured by levels or along a spectrum. For example, a relatively strict or stringent rule might flag a transaction as fraudulent if the transaction is for more than $50. A relatively relaxed rule might not flag a transaction as fraudulent until the amount of the transaction is more than $1000. The level of strictness or stringence may vary from user-to-user; for instance, a $100 limit might be very strict for an adult, but more relaxed for a college student.

The above is an example of a single rule that can have various threshold values, where the threshold values can be more or less strict. Alternatively, or additionally, different rules might be considered more or less strict when considered against each other. For example, a rule requiring that two or more in-person transactions occurring in quick succession must be performed at physical locations that are relatively close together probably will not be triggered by any legitimate transactions (because the physical payment card cannot be moved between physical locations too quickly). On the other hand, a geographical limit may be relatively more strict, because legitimate users do travel outside their home zone from time to time.

Strict rules may indicate greater assurance that a customer is authorized when the rule is satisfied than relaxed rules.

However, strict fraud rules may inconvenience customers. For example, strict rules may require customers to repeatedly verify transactions that are very similar or require them to authenticate their identity repeatedly. In some cases, strict fraud rules may repeatedly deny transactions even for authorized users. These challenges may cause customers to stop using the payment card and/or to form a negative opinion of a financial institution associated with the card. However, consistently relaxed rules may leave the customer open to fraud.

Accordingly, a system is needed to intelligently select fraud rules for transactions, thereby improving the efficiency and reliability of transaction authorization processes. Various embodiments described herein can manage fraud rules and/or generate authorization directions for in-person transactions based on the location of a merchant and the location of at least one device likely to be in proximity to the customer. For example, the device may be the user's personal vehicle (or, in some embodiments, a form of public transportation such as a bus, taxi service, or ride-share vehicle used by the user). Co-location of an authorized customer's device with the location of a transaction may indicate, for example, that the transaction is legitimately associated with the customer.

As used herein, a fraud rule can be relaxed or made more strict in several ways. For example, a fraud rule may be associated with a threshold value (such as a purchase limit). A default value (e.g., $500) may initially be applied, but this threshold value may be made less restrictive (e.g., $1000) or more restrictive (e.g., $100). In another example, a server may refrain from applying a rule that is considered relatively strict (e.g., a geographical limit) in order to relax the overall set of rules. Thus, only more relaxed rules (or in some cases, no rules at all) may be applied. In yet another example, a rule that is considered more strict may be replaced by a rule considered less strict (or vice versa).

Embodiments may include a payment server informed by a client device application, such as an in-vehicle computer application, that can manage and/or apply fraud rules for transactions. Some embodiments may manage fraud rules based on location data provided by at least one client device application and/or location data associated with at least one transaction system. For example, embodiments may manage fraud rules based on the correspondence of the location data from an in-vehicle computer application and location information associated with at least one transaction system. In another example, embodiments may manage fraud rules according to the correspondence of additional location data associated with a personal mobile device, such as a mobile phone. In these examples, embodiments may relax fraud rules for the transaction based on the location correspondence. Various embodiments may identify a set of one or more merchants based on location data of at least one client device. Components may relax and/or restrict fraud rules for at least one merchant based on it being included in the set. Embodiments may manage rules based on historical transaction data, on a transaction-by-transaction basis, or a combination thereof.

In some embodiments, the client device may comprise a vehicle, such as an automobile, and a client device application may comprise an in-vehicle computer application. In some embodiments, at least one client device may comprise a mobile phone and a client device application may comprise a software application on the phone. In some embodiments, a client device application may receive location data based on a client device being identified as being within a set of geofenced zones tracked by a payment server. Some embodiments may receive a report of the client device having been stolen and retrieve location data and/or manage fraud rules accordingly.

In various embodiments, one or more computing devices may implement at least one of the components, techniques, or aspects described herein, resulting in increased capability and improved functioning of the one or more computer devices. Components of various embodiments described herein may provide specific and particular manners of automatically managing transaction fraud rules, applying fraud rules specific to circumstances of a transaction, and/or dynamically adjusting transaction fraud rules according to location data received from at least one client device. Several embodiments may perform expected behaviors and behaviors involving fraud rule management independent of software using familiar, user-friendly interface objects.

Embodiments may enable an improved technological result to be achieved. Specifically, various embodiments, components, techniques, or aspects described herein may be implemented as a set of rules that improve computer-related technology by allowing a function not previously performable by a computer. For example, an improved technological result may include managing a set of transaction fraud rules according to location data associated with at least one client device.

With general reference to notations and nomenclature used herein, the present disclosure discusses payment cards for the sake of simplicity. However, embodiments may use other types of payment instruments. For example, a customer may make payments via a mobile device using near field communication (NFC), Bluetooth, or other communication technique. Embodiments are not limited in this context. Additionally, a customer may be a user of a payment card and/or of a device. Accordingly, the present disclosure may refer to a customer as a "user."

Furthermore, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Additionally, the disclosure may refer to the coupling of one or more components. Coupling may indicate a connection or communication between components via a wired connection, wireless connection, a network connection, or a combination thereof. The same or different entities may manage the coupled components.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary environment in which disclosed embodiments may operate. Embodiments are not limited in this context.

Specifically, aspects of environment 100 illustrate aspects of use of a client device in the form of vehicle 102, which may be associated with a user, in the management of transaction fraud rules, or fraud detection rules, for at least one enterprise. For the sake of simplicity, enterprises may be described herein as "merchants." However, one will recognize that the disclosure is not limited by this to embodiments involving, for example, stores, vendors, or other types of merchants. Rather, embodiments may include any number of enterprise types.

A vehicle 102 may comprise a client device application, such as an in-vehicle computer application system. In many embodiments, aspects of a client device application may be associated with the user of the client device. In some embodiments, an account used for the client device application may be associated with a user and with a client device. For example, an in-vehicle computer application may be used with an account associated with a user and a specific vehicle 102.

As illustrated in environment 100, a vehicle 102 may be in positions such as a street 104 or a parking lot 106. However, one will recognize that the vehicle 102 is shown in these locations only for purposes of illustration, and that such a vehicle 102 may exist in any physical location.

An environment such as that illustrated in environment 100 may comprise at least one merchant. In FIG. 1, the illustrated environment comprises merchant 108, merchant 110, merchant 112, merchant 114, merchant 116, merchant 118, merchant 120, and merchant 122. Each merchant may be associated with location data. In many embodiments, location data may comprise location information for the merchant. For example, location information may comprise a unique latitude and longitude or a unique geotag. Furthermore, each merchant may be associated with a transaction system. In some cases, a transaction system may comprise at least one network-enabled computer used for economic activity with customers. A transaction system may, in some embodiments, include at least one device capable of enabling card-present transactions, for example, a credit card reader. In many embodiments, a transaction system associated with a merchant may be coupled to at least one payment server, as described in greater detail with respect to further drawings.

In some embodiments, locations may be associated with a user. For example, an address may be associated as a home 126 of a user of a client device application. One will recognize that a client device application may include reference to several locations associated with at least one user. For example, a client device application may have record of a home 126 of a user, an office of a user, a work place of a user, a home of an associate of a user, a location flagged as a favorite of a user, another location indicated to be relevant with respect to an account of a client device application, or any combination thereof.

In some environments, at least two merchants may be associated with each other. For example, merchant 110, merchant 112, merchant 114, merchant 116, merchant 118, and merchant 120 may be associated as part of a shopping district, such as a shopping mall 128. Components of various embodiments described herein may access indications of merchant associations.

Regarding the exemplary environment 100 of FIG. 1A, embodiments may recognize that a vehicle 102 is in proximity to parking lot 106. In some embodiments, an in-vehicle computer application may access location data for vehicle 102, such as via a global positioning system (GPS), satellite signal, or other known location tracking system.

In various embodiments, components described herein may determine based on the location data of vehicle 102 and data relating to at least one target location that the vehicle 102 is within and/or outside of a range of at least one target location. In many embodiments, a range may be used to define a geofenced zone around a target location. In many embodiments, a target location may comprise a merchant and/or associated store. For example, vehicle 102 may be recognized as being outside of a narrow range 130 of merchant 114, but within a medium range 132 and within a wide range 134 of merchant 114. A range may be a predetermined or predefined distance or a dynamically defined difference according to different embodiments. For example, a radius about a target location and measured in units such as miles may define a range. In another example, travel time to the target location may define a range. In this example, the infrastructure of the environment, such as roads, driving speed limits and/or public transportation routes, estimated and/or determined traffic data, historic traffic data, and/or any combination of data otherwise useful for estimating travel time to a target location may inform a range definition. In another example, a geofenced zone may comprise a parking lot associated with a merchant. In yet another example, a geofenced zone may comprise a parking lot in proximity to a merchant.

Some embodiments may use a single default range, such as medium range 132, or several different ranges. In various embodiments, components described herein may determine that the vehicle 102 is within and/or outside of multiple ranges centered on more than one merchant. For example, an embodiment may recognize vehicle 102 to be within a medium range 132 of merchant 108, merchant 110, merchant 112, and merchant 114, but outside of a medium range 132 of merchant 122.

In some embodiments, the system may consider a client device to be within a range of a merchant by nature of being in a range of an associated merchant. For example, regarding merchants as being associated as part of shopping mall 128, a vehicle 102 may be within a narrow range 130 of merchant 110, merchant 112, and merchant 114 while being outside a narrow range 130 of merchant 116, merchant 118, and merchant 120. However, some embodiments may determine vehicle 102 to be within a narrow range 130 of merchant 116, merchant 118, and merchant 120. Embodiments may base this determination on the common association of the merchants with any of merchant 112, merchant 114, and merchant 116 as part of shopping mall 128. Additionally, or alternatively, components of embodiments may recognize association of merchants with each other but still distinguish client device presence with respect to distinct ranges for each merchant.

A client device application, such as an in-vehicle computer application of vehicle 102, may communicate with a payment server. In many embodiments, a payment server is coupled to a transaction system of a merchant. A client device application may communicate with a payment server based on the occurrence of one or more triggers. A trigger may include an action associated with the vehicle 102 associated with the in-vehicle computer application. For example, a trigger may include turning on a vehicle, stopping a vehicle, switching gears in a vehicle, turning off a vehicle, or a motion pattern indicating an activity of the vehicle. In many embodiments, a client device application may detect a trigger event and provide data relating to a location of itself and/or of an associated client device to a payment server based on the detection.

In some embodiments, a client device application may communicate with a payment server according to a determination that the client device is in proximity and/or within a range of a target location. For example, if a vehicle 102 is within a range 132 of merchant 114, an in-vehicle computer application in the vehicle may communicate with a payment server. In some embodiments, a client device application may communicate with a payment server based on a determination that the client device is in proximity of and/or within a range of multiple target locations. In many embodiments, communication between a client device application and a payment server may include an indication of the associated client device being in proximity and/or within a range of a specific target location.

Based on the communication between a client device application and a payment server, embodiments may manage transaction rules for at least one target location and/or merchant. In several embodiments, a payment server may compare location data received from a client device application to one or more pre-known and/or calculated geofence and manage at least one transaction rule based on the comparison. For example, a payment server may whitelist merchant 114 and/or relax transaction rules for merchant 114 based on an indication that a vehicle 102 associated with the user is within a range 132 of merchant 114. As an additional example, a payment server may not whitelist merchant 122 and/or may restrict transaction rules for merchant 122 based on an indication that a vehicle 102 associated with the user is not within a range 132 of merchant 122.

In an exemplary sequence of events, a car may move from a first location, such as a home 126, to a second location, such as a parking lot 106 in proximity to a merchant 108. In the exemplary sequence of events, the car may be parked and/or turned off at the second location, and based on the parking and/or turning off of the car, an in-vehicle computer application of the car may provide its location data to a payment server. To continue the exemplary sequence of events, the payment server may then analyze the location data with respect to known and/or calculated geofences and adjust a transaction rule based on the analysis.

Components of some embodiments may manage fraud rules based on indications of a client device being within and/or outside of multiple ranges of a target location. For example, a payment server may restrict parts of fraud rules for a merchant 114 based on an indication that a vehicle 102 associated with the user is outside of a range 130 of the merchant 114, while the payment server may relax parts of fraud rules based on an indication that the vehicle 102 is within a range 134 of the merchant 114. Accordingly, embodiments may determine and apply fraud rules with gradations of strictness based on one or more piece of location data.

Various embodiments may manage and/or apply fraud rules based on information received for at least one additional client device. For example, an additional client device may be a personal mobile device such as mobile phone 136. Additional client devices may comprise client device applications. A user may be logged into the same account simultaneously across multiple devices, with any of or each of the devices being associated with the account. For example, an in-vehicle computer application from vehicle 102 and via a phone application from mobile phone 136 may access the same user account.

Location data may be received that is associated with additional client devices, such as mobile phone 136. Components of various embodiments described herein may manage and/or apply fraud rules for a merchant based on location data associated with multiple client devices.

In some embodiments, location range settings may differ between devices. For example, a vehicle 102 may have a range setting corresponding to a relatively wide range, such as wide range 134, while a personal mobile device may have a narrow range setting. For example, a narrow range setting may exist entirely within one store, or a narrow range setting may indicate that the device and the merchant are co-located. In some embodiments, different types of devices may have different preconfigured location range settings. For example, a vehicle may have a wider range setting than a mobile phone.

In some embodiments, location range settings for different devices may be adjusted via a client device application. Additionally, or alternatively, location range settings may be determined based on historic data associated with one or more different devices. For example, historic data relating to a mobile device's proximity to a vehicle while the vehicle is stopped may be used to estimate how far a user tends to walk from their vehicle. One or more location range settings for the vehicle and/or mobile device may be set based on the estimated range.

Correspondence of location data of multiple devices may indicate common proximity to a merchant. Some embodiments may use the correspondence to relax fraud rules for that merchant. For example, fraud rules for merchant 112 may be relaxed based on a transaction request received from merchant 112, location data associated with mobile phone 136 indicating presence at merchant 112, and location data associated with vehicle 102 indicating presence of the vehicle 102 in parking lot 106 associated with merchant 112, wherein the transaction request, vehicle 102, and mobile phone 136 are all associated with a common user.

Additionally, or alternatively, embodiments may restrict fraud rules based on a lack of correspondence of location data of multiple devices. For example, embodiments may restrict fraud rules for merchant 114 based on a transaction request received from merchant 114 if location data is received associated with vehicle 102 being in a range 132 of merchant 114 but location data is also received indicating that mobile phone 136 is located at merchant 112 rather than merchant 114. In this example, the mismatch of merchants associated with the transaction request and the location of the mobile phone 136 may indicate that a user's phone and/or wallet may have been stolen while the user was still at shopping mall 128. Some embodiments may favor conservative transaction authorization practices and restrict fraud rules according to mismatched location data.

Various embodiments may define a range centered around a client device, such as vehicle 102. Some embodiments may whitelist merchants within a range of the client device. Additionally, or alternatively, embodiments may manage fraud rules for a merchant based on the presence of the merchant within a range of the client device.

Various embodiments account for instances in which a user may use transportation other than a vehicle associated with their account. For example, a user may take advantage of public transportation, a ride hailing service such as a rideshare or taxi service, or a bicycle or scooter share service. Cab 138 may represent transportation offered to a user via a ride hailing service, for example.

In some embodiments described herein, systems useful for determining and/or estimating use of modes of transportation other than a vehicle registered for the user may inform components. For example, components may include settings for recurring transportation events set by a user via a client device application. In some embodiments, components may access historic transportation data associated with a user, according to permissions granted by the user. Components may generate a model based on the historic transportation to estimate a user's location. Estimated user location may be used to determine at least one target location to which the user may be in proximity. Accordingly, embodiments may whitelist the at least one determined target location and/or manage the fraud rules based on the determination.

In some embodiments described herein, components may access information that a user has accessed transportation and/or data associated with a user's use of a transportation service, such as a ride hailing service. For example, components may receive a record of a user's transaction with a transportation service, such as a receipt. In some embodiments, a record of a user's transaction with a transportation service may indicate payment by a credit or other financial account associated with the user. Embodiments may receive a record of a transaction with a transportation service from a separate application. For example, embodiments may receive a record from an email inbox, a payment server, a user via an upload, or another source coupled to the client device application and/or payment server. As a further example, embodiments may retrieve a record of a user's access of public transportation from a server associated with the public transportation service. Based on the record, embodiments may determine at least one mode of transportation for the user.

Some embodiments may use a record of a transaction with a transportation service to update historic transportation data associated with a user. Some embodiments may use a record of a transaction with a transportation service to estimate a user's drop-off location in real or near real time. Some embodiments may determine a user's drop-off location based on location data provided by a transportation service or an in-vehicle computer application of a transportation service vehicle. For example, an embodiment may receive location data indicated as a drop-off location for a user from a transportation service. In another example, a record of transaction may be used to determine an association between a user and a transportation service vehicle. In this example, the transportation service vehicle stopping may trigger an associated in-vehicle computer application to communicate location data with a payment server. Accordingly, embodiments may determine a user's drop-off location based on the location data of the transportation service vehicle.

Alternatively, or additionally, a drop-off location or drop-off time for a user may be extrapolated from information available to a credit server associated with the credit account associated with the user. For example, a paid fare recorded in information available to a credit server may be used to estimate a range of possible travel by the user from a known pick-up time and/or pick-up location, and the estimated range may be used to extrapolate a drop-off time and/or drop-off location. In another example, historic data relating to transportation use may be available to a credit server, including at least one historic drop-off time and/or location. Based on a similarity of transactions, a drop-off location or drop-off time for a user may be extrapolated from the historic data available to the credit server.

Various embodiments may use a user's estimated or extrapolated drop-off location as an estimated user location. Some embodiments may use a record of a transaction with a transportation service to estimate a drop-off time for the user.

Specifically, embodiments may retrieve data from a record of a transaction with a transportation service. Embodiments may use the data to determine at least one location in which the user's drop-off location could probably exist. In some embodiments, the determined range could be based on a pickup point identified in the record. In some embodiments, a client device application may identify a pickup point using separate location data received. For example, embodiments may receive location data marked as a pickup point from a transportation service. In some embodiments, a pickup point be a known location associated with the user, such as home 126. An estimated range 140 may represent possible locations of a user's drop-off locations determined according to data including a pickup point, pickup timestamp, fare of transportation, duration of trip, traffic data, historic transportation service transaction data, or any combination thereof.

Various embodiments may identify at least one merchant corresponding with a user's estimated or extrapolated destination by using an estimated range 140. For example, merchant 122 may be within an estimated range 140 based on a user's record of transaction with cab 138. Some embodiments may base an estimated range 140 at least in part on a travel time indicated by the record of the user's transaction with cab 138. Some embodiments may use a user's estimated or extrapolated drop-off time to determine at least one merchant corresponding with the user's destination. For example, a user's record of transaction with cab 138 may be used to determine that a user's estimated drop-off location is within range 141. However, in this example, a difference between the estimated or extrapolated drop-off time of the user's use of transportation and a current and/or recently detected timestamp may be used to determine that the user could have reasonably walked to merchant 122 in the time difference. Accordingly, embodiments may manage fraud rules according to a user's estimated or extrapolated transportation. For example, a payment server may relax fraud rules for merchant 122 based on a possibility that the user may make a legitimate transaction there based on travel via cab 138 or travel via cab 138 and walking time. In another example, a payment server may restrict fraud rules for merchants associated with shopping mall 128 based on location data being outside of the range of possible travel estimated for a user based on a pickup point of home 126 and a record of transaction with cab 138. Some embodiments may restrict fraud rules or restrict relaxation of fraud rules based on receiving an indication that a client device, such as a vehicle, has been stolen. For example, embodiments may disable relaxing of fraud rules in response to receiving an indication that a client device has been stolen.

The environment 100 and aspects thereof are illustrated merely to clarify examples of use of at least one embodiment described herein. One will recognize that embodiments may exist in other environments, which may or may not contain similar elements.

Figure 2:
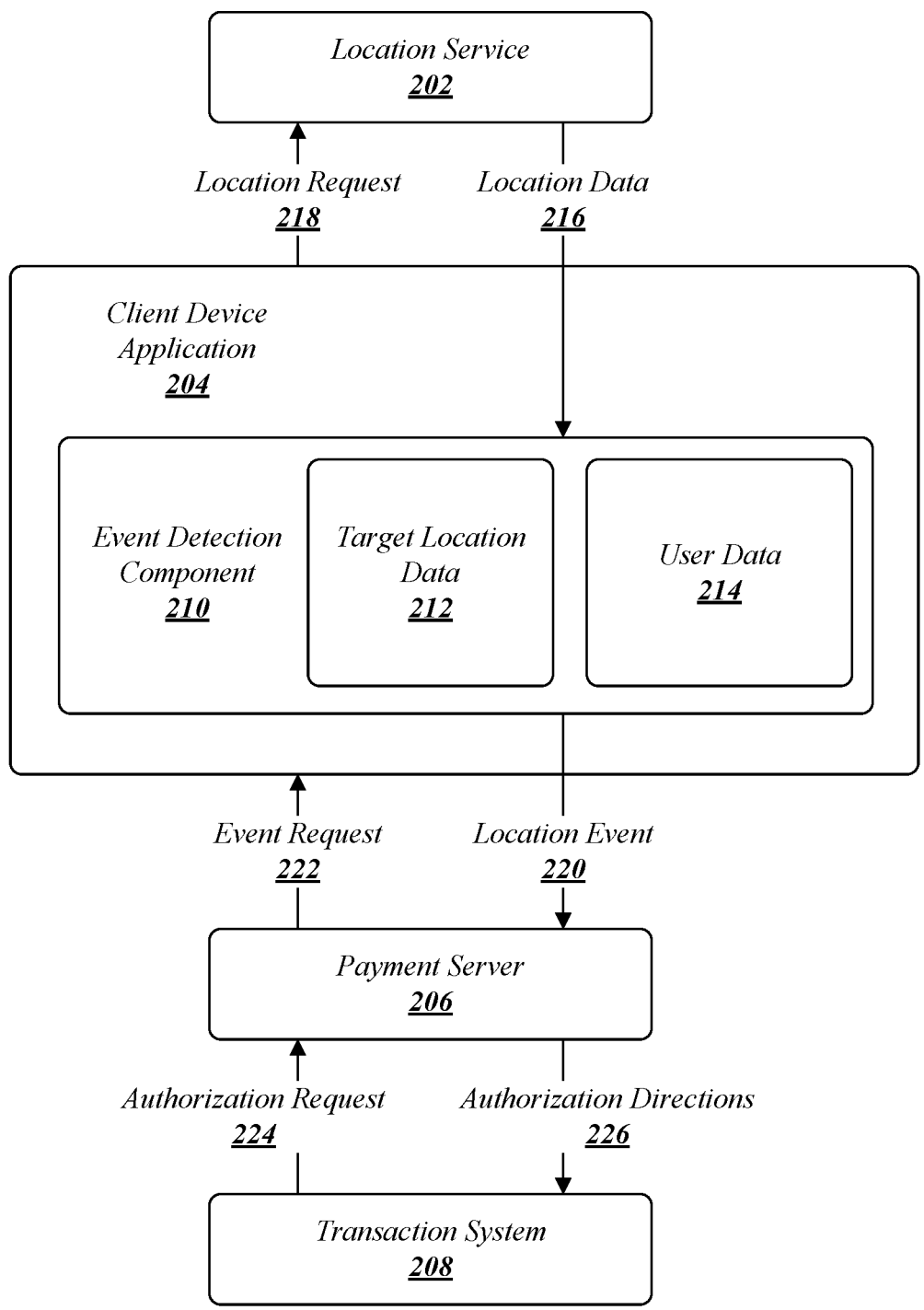
FIG. 2 is a block diagram depicting exemplary information exchange in a client device application.

FIG. 2 is a block diagram depicting exemplary information exchange in a client device application. In architecture 200, a location service 202 inform at least one client device application 204, which may communicate with at least one payment server 206. For example, a payment server 206 may be a credit server associated with a user's credit account. The payment server 206 may communicate with at least one transaction system 208. One will recognize that architecture 200 is illustrated as an example, but that embodiments may include any combination of the elements therein. Embodiments are not limited in this context.

A client device application 204 may be a software-enabled system capable of processing location data associated with a client device. In many embodiments, aspects of the client device application 204 may operate on or in association with memory on the client device. For example, a client device application 204 may comprise an in-vehicle computer application stored in a memory of a vehicle, such as vehicle 102 of FIG. 1. In some embodiments, the in-vehicle computer application may be part of an automobile computer operating system for the vehicle.

In many embodiments, a client device application 204 may be network-enabled. In some embodiments, a user may access aspects of a client device application 204 via a user interface. In embodiments, a user may specify log in credentials to access an account. The account may be associated with one or more client devices. In some embodiments, a client device application 204 may request and/or receive input of express user approval or denial of a transaction, which the client device application 204 may communicate to aspects of a payment server 206, such as an authorization component 430 as described in greater detail herein.

The client device application 204 may include an event detection component 210. The event detection component 210 may determine if a location data of a client device corresponds with location data of at least one target location. Alternatively, or additionally, one or more aspects of an event detection component may be located on a payment server 206. The event detection component 210 may determine the correspondence of a client device location with location data of at least one target location based on target location data 212. Target location data 212 may exist in a memory at the client device application 204 or be otherwise coupled to the client device application 204. In some embodiments, target location data 212 may be accessed based on location data received from a location service 202 and/or based on an event associated with the client device of the client device application 204, such as a vehicle stopping.

Target location data 212 may include at least one table, database, and/or other data store including information on at least one target location, including location data of the at least one target location. In many embodiments, target location data 212 may comprise information target locations tracked by a payment server 206. Location data of a target location may include GPS coordinates, latitude and longitude, street address, other information useful for determining the physical placement of a target location, or any combination thereof. In some embodiments, target location data 212 may additionally include for a target location a unique target location identifier for each included target location. In some embodiments, a target location identifier may indicate a target location property name, merchant associated with the target location, or a combination thereof.

In various embodiments, an event detection component 210 may access user data 214. User data 214 may exist in a memory at the client device application 204 or be otherwise coupled to the client device application 204. Coupling may, in some embodiments, be via a network connection. User data 214 may, in some embodiments, include one or more user devices associated with one or more user profiles, users, indication of a client device application, or any combination thereof. Additionally, or alternatively, user data 214 may contain data associated with users useful for understanding the context of a user and/or their actions. For example, a geographic region of a user may be specified for the user, or historic transaction data of the user may be associated with the user. Many embodiments may access user data 214 according to a specific user. Various embodiments may restrict access via a user profile to data of users not associated with the user profile.

A client device application 204 may receive location data 216 from a location service 202. In some embodiments, an event detection component 210 of a client device application 204 may receive location data 216 from a location service 202. Location data 216 may include a single component of information, a data packet, or other indication of a device's location. Embodiments are not limited in this context. In many embodiments, location data 216 may be associated with a user device associated with a user profile of a client device application. For example, location data 216 may be associated with a vehicle 102 using an in-vehicle computer application, as illustrated with respect to FIG. 1.

In some embodiments, a client device application 204 and/or an event detection component 210 may receive location data 216 from a location service 202 in response to the location service 202's receipt of a location request 218. In many embodiments, a location service 202 may comprise a network and/or satellite-enabled system for determining the location of a client device, for example, a GPS navigation system in a vehicle. The location request 218 may be received from aspects of a client device application 204. A location request 218 may comprise information identifying a client device for which location data is desired. In many embodiments, the client device identified by a location request 218 may be associated with the client device application 204 from which the location request 218 was sent, the profile used to access the client device application 204, and/or the location service 202. For example, the client device may be a vehicle 102 with an in-vehicle computer application. In this example, the in-vehicle computer application may send a location request 218 including a unique identifier of the vehicle 102 to a location service 202 to which the vehicle 102 subscribes. In some embodiments, a location request 218 may comprise an identifier of the client device application 204 and/or an identifier of an event detection component 210. In some embodiments, a location request 218 may comprise a pointer to the client device application 204 and/or a pointer to an event detection component 210.

In some embodiments, a client device application 204 may send a location request 218 on a periodic basis. Periodic sending of location requests may enable the payment server 206 to track the location of the client device associated with the client device application 204. Components of embodiments may manage periodic sending of location requests via different methods. For example, a client device application 204 may manage a location request 218 using a timer. In another example, another event at the client device application 204 and/or at the client device may trigger the sending of a location request 218. For example, a vehicle stopping or being parked may trigger a client device application 204 to send a location request 218.

In response to receiving the location request 218, a location service 202 may send location data 216 comprising information of the location of the device identified in the location request 218. The location service 202 may send location data 216 to a client device application 204 and/or an event detection component 210 identified in a location request 218.

Some embodiments may be suited to accommodate location requests from a single client device application 204 as relating to multiple client devices. In some embodiments, a separate location request 218 may be sent relating to each respective client device. In some embodiments, a single location request 218 may include indications of multiple client devices. Location data 216 may include data relating to the location of one or more devices specified in a location request 218. In some embodiments, a location service 202 may send location data 216 indication for each location request 218 in a one-to-one relationship. In some embodiments, a location service 202 may not sent location data 216 indications and receive location request 218 packets in a one-to-one relationship.

Aspects of client device application 204 and/or event detection component 210 may determine the correspondence of the location of at least one client device with the location of at least one target location based on location data 216 and target location data 212. In some embodiments, the event detection component 210 may determine locations to correspond based on positioning data for the at least one client device and the at least one target location being the same. Alternatively, or additionally, the event detection component 210 may determine locations to correspond based on the locations being within a range of each other. For example, comparison of locations may be used to determine proximity of at least one to another. As determined with respect to FIG. 1, at least one range around a client device and/or target location may be predetermined and/or estimated. Real time or near real-time data may inform range estimations or extrapolations in some embodiments. Ranges may be based on distance, estimated travel time, other distance metric, or any combination thereof. In some embodiments, the client device application 204 may use historical data such as traffic data to estimate ranges. In some embodiments, comparisons may use at least one client device's or target location's position data, without a range calculation. Some embodiments may probabilistically estimate at least one range by using a model and/or machine learning.

In some embodiments, a range may be set for each component of location data 216 related to a different client device. Range may be, in some embodiments, preset, determined by a user, set according to device type, or any combination thereof. As discussed with respect to FIG. 1, ranges may be determined to be the same or different with respect to different client devices. Various embodiments may determine location correspondence based upon partial or complete overlap of position data and/or range data associated with position data for one or more client devices.

An event detection component 210 and/or aspects of a client device application may send a location event 220 in response to a determination of correspondence between recently-detected location data of at least one client device and at least one target location. In some embodiments, a location event 220 may indicate a lack of correspondence between location data of at least one client device and at least one target location. In many embodiments, a payment server 206 may receive a location event 220. A payment server 206 may be responsible for authorizing transactions associated with a user and maintaining a set of fraud rules that are consulted to determine whether to authorize a transaction. In some embodiments, a payment server 206 may track at least one merchant and/or geofenced zone around a merchant. In some embodiments, a location event 220 may indicate that a client device has entered at least one of a set of geofenced zones tracked by the payment server 206.

In some embodiments, a location event 220 may not be sent to a payment server 206 while a client device is outside of a set of geofenced zones tracked by the payment server 206. In some embodiments, a sending of a location event 220 to a payment server comprising a location update may be suspended until a client device application 204 determines that a client device or indication of conveyance associated with the user has been recognized as not being within a geofenced zone. For example, a client device application 204 or a payment server 206 may determine that a conveyance is located at a home or office associated with a user and transmit a request to suspend receipt of further location updates until the conveyance is not located at the home or the office of the user.

In various embodiments, a client device application 204 may send a location event 220 to a payment server 206 in response to an event request 222 being received from the payment server 206. In some embodiments, a client device application 204 may predetermine a location event 220 and send the location event 220 to the payment server 206 based on a received event request 222 and a received location event 220. In some embodiments, client device application 204 may determine and/or send aspects of a location event 220 in response to receiving an event request 222. An event request 222 may comprise, in some embodiments, an indication of a user, a user profile, and/or a client device.

A payment server 206 may receive an authorization request 224 from a transaction system 208. An authorization request 224 may be associated with a particular transaction at a transaction system 208. For example, an authorization request 224 may comprise a request to conduct a sale with a credit account associated with a user. A transaction system 208 may be associated with at least one merchant. An authorization request 224 may include an indication of the transaction system and/or associated merchant. In many embodiments, an authorization request 224 may comprise an indication of a user associated with the transaction of the authorization request 224. For example, an authorization request 224 may include a card number, user name, account number, other user identifier, or any combination thereof. In some embodiments, an authorization request 224 may include information relating to a transaction. For example, an authorization request 224 may include a PIN entered into a transaction system 208 by a user, or an indication of a match or lack thereof between a user's identifying information and identifying information associated with a payment card.

A payment server 206 may determine authorization directions 226 based on the authorization request 224. In many embodiments, the payment server 206 may determine authorization directions 226 based on an authorization request 224 and at least one location event 220, as described herein. In some embodiments, payment server 206 may send an event request 222 in response to receiving an authorization request 224. For example, a payment server 206 may, based on a sent event request 222 and/or received location event 220, determine a location associated with a requested sale of an authorization request 224. In some embodiments, a payment server may receive the authorization request 224 and send the event request 222 separately.

In many embodiments, a payment server 206 may determine authorization directions 226 based on receiving an authorization request 224. The payment server 206 may use a location event 220 to determine a set of transaction fraud rules for the merchant of the authorization request 224. For example, if a location event 220 indicates a set of target locations for which location corresponds with location data for at least one client device, the payment server 206 may relax fraud rules for merchants associated with the target locations of the set of target locations. In this example, if the merchant of the authorization request 224 is in the set of merchants for which fraud rules have been relaxed, the payment server may authorize the transaction of the authorization request 224 based on the relaxed rules being satisfied. In another example, if a location event 220 indicates a set of target locations for which location does not correspond with location data for at least one client device, the payment server 206 may restrict fraud rules for merchants associated with the target locations of the set of target locations.

In some embodiments, a payment server 206 may restrict fraud rules and/or restrict relaxation of fraud rules in response to receiving an indication that at least one client device has been stolen or that fraudulent activity has been determined to be associated with a user account. For example, a payment server 206 may not relax fraud rules associated with a merchant for a user account associated with a vehicle in a range of the merchant based on an indication that the vehicle has been stolen from the associated user. Some embodiments may send an alert to a user, a business, and/or a law enforcement organization based on information received relating to a stolen client device.

The authorization directions 226 may, in some embodiments, include an approval of a transaction, a denial of a transaction, and/or a flag for further review. Authorization directions 226 may include a request for further data needed to determine authorization. For example, in a case where fraud rules have been restricted for an authorization request 224, authorization directions 226 may include a request for the transaction system 208 to send a PIN for the user to the payment server 206. In some embodiments, a transaction system 208 may send at least one more authorization request 224 or further information associated with an authorization request 224 to a payment server 206 based on the first authorization directions 226. A payment server 206 may generate additional authorization directions 226 based on the additional authorization request 224 or further information associated with an authorization request 224.

Figure 3:
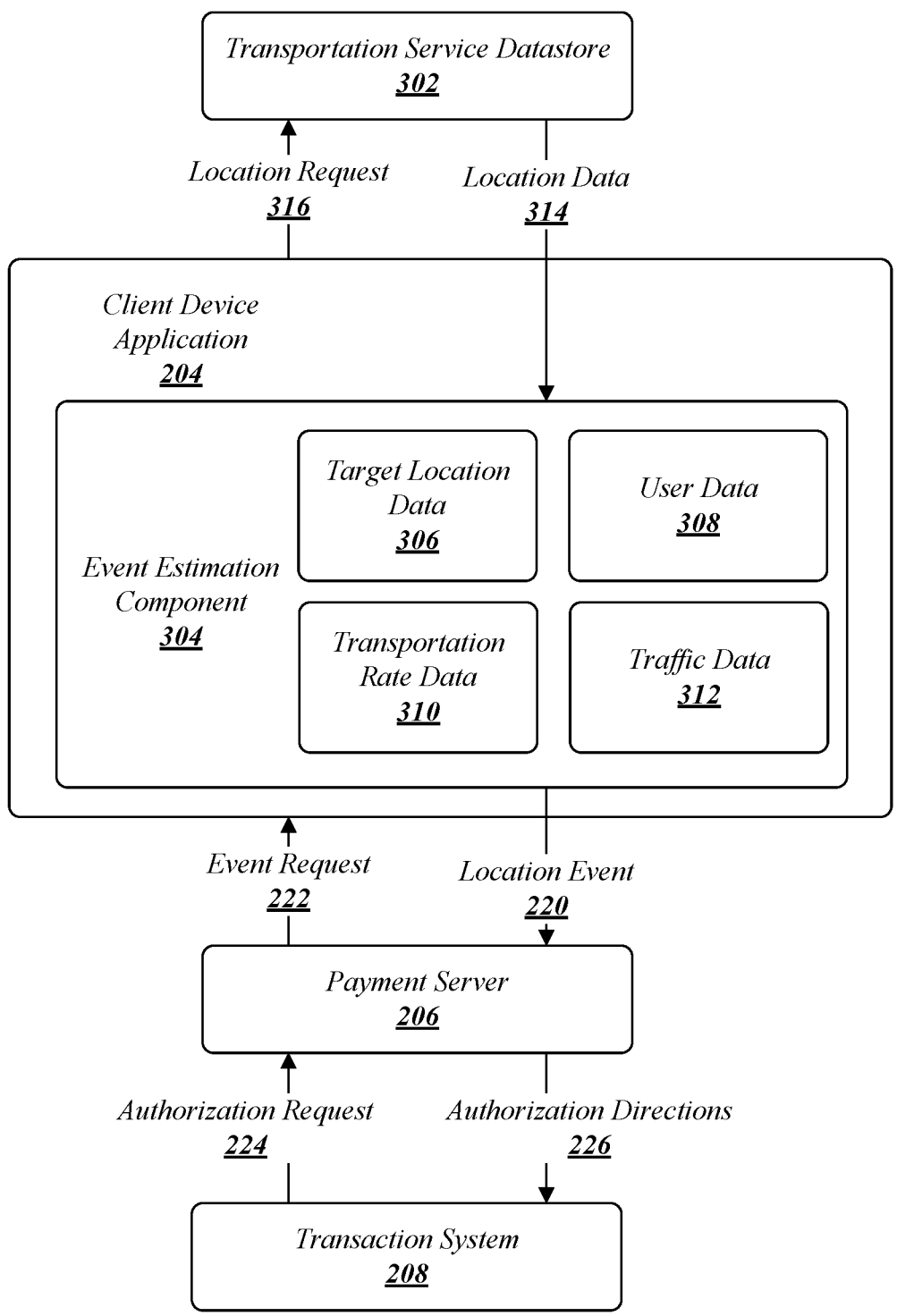
FIG. 3 is a block diagram depicting further examples of information exchange in a client device application.

Components of architecture are illustrated to provide at least one exemplary disclosure. Aspects of functionality of components may be distributed across an architecture as illustrated or otherwise. For example, aspects of an event detection component 210 may be implemented on a payment server 206 as opposed to on a client device application 204. Embodiments are not limited in this context. FIG. 3 illustrates exemplary aspects of a use of a client device application according to one or more embodiments described herein. In architecture 300, a transportation service datastore 302 may inform at least one client device application 204, which may communicate with at least one payment server 206. The payment server 206 may communicate with at least one transaction system 208. As described herein, aspects of client device application 204, payment server 206, transaction system 208, and other components may be similar or dissimilar to components described with respect to FIG. 2. Furthermore, one will recognize that architecture 300 is illustrated as an example, but that embodiments may include any combination of the elements therein. Embodiments are not limited in this context.

As described with respect to FIG. 1, components described herein may access data associated with a user's use of a transportation service, such as a ride hailing service, following permissions set by a user. In architecture 300, a client device application 204 may communicate with aspects of a transportation service datastore 302 to determine aspects of a user's access of a transportation service. In some embodiments, the transportation service datastore 302 may be a database, server, or other system managed by the transportation service of the transaction. In some embodiments, the transportation service datastore 302 may be a separate memory and/or system which contains at least one record of a user transaction with a transportation service. For example, a transportation service datastore 302 may comprise an email application, wherein the email application includes an inbox containing a receipt of a user's transaction with a transportation service. In another example, a transportation service datastore 302 may comprise aspects of a credit server associated with the credit account of a user, wherein the record of the user's transaction with the transportation is maintained as a transaction record. In some embodiments, a transportation service datastore 302 may be part of or coupled to a payment server 206. In some embodiments, a transportation service datastore 302 may be folder or other repository to which a user may upload a record of a transaction with a transportation service. Aspects of transportation service datastore 302 may be local to a client device upon which a client device application 204 is present, part of a client device application 204 itself, located remotely, or any combination thereof. Embodiments are not limited in this context.

A client device application 204 may be a software-enabled system capable of processing location data associated with a user and/or user account. In many embodiments, a client device application 204 may be network-enabled. In some embodiments, a user may access aspects of a client device application 204 via a user interface. A user may specify log in credentials via a user interface to access an account. The account may be associated with one or more client devices, client applications, or combinations thereof.

The client device application 204 may include an event estimation component 304. In various embodiments, aspects of an event estimation component 304 may be included in a client device application 204 in addition to or instead of an event detection component 210, as described with respect to FIG. 2. In some embodiments, one or more aspects of an event estimation component 304 may alternatively or additionally be on a payment server 206.

An event estimation component 304 may estimate a location of a user and/or user device and determine if the estimated location corresponds with location data of at least one target location. In many embodiments, an event estimation component 304 may estimate a location of a user and/or user device using information received from a transportation service datastore 302.

Some embodiments may probabilistically determine the correspondence of estimated user location with target location data. Some embodiments may determine the correspondence of estimated user location with target location data by using a model, machine learning, or other recognized method.

The event estimation component 304 may estimate the correspondence of a client device location using location data of at least one target location based on target location data 306. Target location data 306 may exist in a memory at the client device application 204 or be otherwise coupled to the client device application 204.

Target location data 306 may comprise at least one table, database, and/or other data store comprising information on at least one target location, including location data of the at least one target location. For example, target location data 306 may include at least some aspects of target location data 212. Location data of a target location may comprise GPS coordinates, latitude and longitude, street address, other information useful for determining the physical placement of a target location, or any combination thereof. In some embodiments, target location data 306 may additionally include for a target location a unique target location identifier for each included target location. In some embodiments, a target location identifier may indicate a name of the target location property, merchant associated with the target location, or a combination thereof.

In various embodiments, an event estimation component 304 may access user data 308. User data 308 may exist in a memory at the client device application 204 or be otherwise coupled to the client device application 204. User data 308 may, in some embodiments, include one or more user devices associated with one or more user profiles. In some embodiments, user data 308 may include historic data of at least one transaction of the user with a ride hailing service. In some embodiments, user data 308 may include one or more aspects of user data 214. For example, user data 308 may, in some embodiments, include one or more user devices associated with one or more user profiles, users, indication of a client device application, data associated with users useful for understanding the context of a user and/or their actions, or any combination thereof. In many embodiments, a client device application 204 may access aspects of user data 308 for a specific user in association with a user profile. Various embodiments may restrict access via a user profile to data of users not associated with the user profile.

An event estimation component 304 may, in some embodiments, further access data such as transportation rate data 310 and/or traffic data 312. Aspects of transportation rate data 310 and/or traffic data 312 may exist in a memory at the client device application 204, in a remote coupled memory, or a combination thereof. In various embodiments, a client device application 204, a transportation service datastore, a third-party platform, or any combination thereof may collect and/or maintain aspects of transportation rate data 310 and/or traffic data 312.

Transportation rate data 310 may include historic transportation service rates, current historic transportation service rates, estimated transportation service rates, or any combination thereof. Aspects of transportation rate data 310 may be associated with information useful for understanding the context of the rates. For example, transportation rates in transportation rate data 310 may be associated with geographic region, distance of transportation, pickup point, drop-off location point, pickup timestamp, travel time, a transportation service, indications of discounts and/or promotional rates used, or any combination thereof. In some embodiments, aspects of transportation rate data 310 may be related to a user's engagements with one or more transportation services. Alternatively, or additionally, aspects of transportation rate data 310 may relate to multiple users' engagement with one or more transportation services.

Traffic data 312 may include data relating to historic traffic patterns, current traffic data, estimated traffic data, or any combination thereof. In some embodiments, traffic data 312 may comprise data relating to infrastructure development, for example, highway construction, road closures, or changes in traffic flows. Aspects of traffic data 312 may be associated with information useful for understanding the context of the traffic data. For example, data in traffic data 312 may be associated with geographic region, timestamps, public transportation availability, or any combination thereof.

Embodiments may estimate aspects of transportation rate data 310 and/or traffic data 312 based on at least one model. Some embodiments may use machine learning to estimate aspects of transportation rate data 310 and/or traffic data 312 according to at least one model based on historical data. In some embodiments, real-time or near real-time data may inform at least one model used to estimate transportation rate data 310 and/or traffic data 312.

An event estimation component 304 may estimate the probable location of a user based on location data associated with the user, such as location data 314. Location data 314 may comprise, in many embodiments, indications of a user, such as a user identifier, and a transaction of the user with a transportation service. Location data 314 may include, for example, at least one of a pickup timestamp, a rate paid or travel time, or a pickup point in association with an indication of the user. In some embodiments, an event estimation component 304 may estimate an area around a pickup location that could be reached within the travel time or for the received fare amount. The probable location of a user may be based at least in part on the estimated area.

Embodiments may estimate a probable location of a user based on at least one aspect of one or more of user data 308, transportation rate data 310, or traffic data 312. Various embodiments may employ machine learning and/or a model to estimate user location based on location data 314 in combination with at least one aspect of user data 308, transportation rate data 310, traffic data 312, or a combination thereof. Some embodiments may estimate user location based on a comparison of at least one component of location data 314 to at least one aspect of target location data 306, user data 308, transportation rate data 310, traffic data 312, or a combination thereof. For example, location data 314 may include indications of a transaction between a user and a ride hailing service A, including payment of fare B at time C from pickup point D. In this example, an event estimation component 304 may recognize historic data from user data 308 indicating the user's repeated past use of ride hailing service A, including several instances of payments of fare B at a time near or equal to time C from pickup point D. The historic data from user data 308 in this example may indicate that out of 10 such past transactions, 9 transactions resulted in the user traveling to drop-off location point E. Accordingly, the event estimation component 304 may estimate the user's location and/or drop-off location point as E with respect to the location data 314 of the example.

In some embodiments, an event estimation component 304 may additionally estimate a drop-off time for the user by the transportation service. The drop-off time estimation may be estimated based on historic and/or current user data 308, traffic data 312, or a combination thereof. In embodiments, the event estimation component 304 may estimate the user's location by using the estimated drop-off time based on a current time stamp or a time stamp associated with an event request 222. For example, the event estimation component 304 may calculate a difference between an estimated drop-off time and a timestamp associated with an event request 222. In this example, the event estimation component 304 may use the difference to determine a walking range in which the user could have walked in the time between being dropped off by a transportation service and the event request 222. The walking range may be used in conjunction with a user's estimated drop-off location to determine at least one possible user location as of the time of the event request 222. For example, the walking range may be centered around a user's estimated drop-off location to determine a range of estimated possible user locations. In some embodiments, an estimated drop-off time may be used without an additional range. For example, an event estimation component 304 may estimate a user's location at the estimated drop-off time may be the estimated destination.

In addition to estimation of a user location, an event estimation component 304 may determine at least one target location corresponding to estimated user location. In some embodiments, the event estimation component 304 may determine that locations correspond based on the estimated user location and at least one target location being the same. Alternatively, or additionally, the event estimation component 304 may determine that locations correspond based on positioning data components indicating location within ranges of each other. For example, the event estimation component 304 may determine proximity of locations to one another by comparing their locations. In various embodiments, at least one range around an estimated user location and/or target location may be predetermined and/or estimated. Real time or near real-time data may inform range estimations. In some embodiments, the client device application 204 may estimate ranges by using historical data such as components of traffic data 312. In some embodiments, at least one estimated user location or target location's position data may be used directly for comparisons, without a range calculation. Various embodiments may determine location correspondence based upon partial or complete overlap of position data and/or range data associated with position data for one or more client devices.

In some embodiments, a client device application 204 and/or an event estimation component 304 may receive location data 314 from a transportation service datastore 302. Components may receive location data 314 in response to the transportation service datastore 302's receipt of a location request 316. The location request 316 may be received from aspects of a client device application 204. A location request 316 may include information identifying a user for which transaction data with a transportation service is desired. In some embodiments, a location request 316 may specify one or more transportation services. In many embodiments, the user identified by a location request 316 may be associated with the client device application 204 from which the location request 316 was sent, the profile used to access the client device application 204, and/or the transportation service datastore 302. A location request 316 may comprise an identifier of the client device application 204 and/or the event estimation component 304.

In response to receiving the location request 316, a transportation service datastore 302 may send location data 314 comprising information of a transaction of the user identified in the location request 316 with at least one transportation service. The client device application 204 and/or an event estimation component 304 identified in a location request 316 may receive the location data 314.

Some embodiments may be suited to accommodate location requests from a single client device application 204 as relating to multiple transportation service datastores 302. In some embodiments, a separate location request 316 may be sent relating to each respective client device. In some embodiments, a single location request 316 may comprise indications of multiple transportation service datastores 302. Location data 314 may comprise data pertaining to one or more transactions specified in a location request 316. In some embodiments, a location data 314 indication may be sent for each location request 316 in a one-to-one relationship. In some embodiments, a location service 202 may not sent location data 216 indications and receive location request 218 packets in a one-to-one relationship.

An event estimation component 304 and/or aspects of a client device application 204 may send a location event 220 in response determining correspondence between at least one estimated user location and at least one target location. In some embodiments, a location event 220 may indicate a lack of correspondence between at least one estimated user location and at least one target location. In many embodiments, a payment server 206 may receive a location event 220. A payment server 206 may authorize transactions associated with a user and maintain a set of fraud rules that are consulted to determine whether to authorize a transaction. In many embodiments, a set of fraud rules may take the form of a decision tree.

In various embodiments, a payment server 206 may send an event request 222 to the client device application 204 based on receiving a location event 220 from a client device application 204. In some embodiments, a client device application 204 may have already generated a location event 220 and merely send it to the payment server 206 based on a receiving an event request 222 and received location event 220. In some embodiments, the client device application 204 may determine aspects of a location event 220 in response to receiving an event request 222. In some embodiments, a client device application 204 may send a location request 218 in response to receiving an event request 222.

In many embodiments, an authorization request 224 may comprise an indication of a user associated with the transaction of the authorization request 224. For example, the authorization request 224 may include a card number, user name, account number, email address, other user identifier, or any combination thereof. In various embodiments, a payment server 206 may receive an authorization request 224 from a transaction system 208. An authorization request 224 may relate to a particular transaction at a transaction system 208. A transaction system 208 may be, in various embodiments, associated with at least one merchant. The authorization request 224 may include an indication of the transaction system and/or associated merchant.

A payment server 206 may determine authorization directions 226 based on the authorization request 224. In many embodiments, the payment server 206 may determine authorization directions 226 based on an authorization request 224 and at least one location event 220, as described herein. In some embodiments, the receipt of an authorization request 224 may trigger the payment server 206 to send an event request 222. In some embodiments, the payment server 206 may receive the authorization request 224 and send the event request 222 separately.

In many embodiments, a payment server 206 may determine authorization directions 226 based on receiving an authorization request 224, wherein the authorization request comprises at least an indication of a transaction and an indication of a merchant. The payment server 206 may use a location event 220 to determine a set of transaction fraud rules for the merchant of the authorization request 224 based at least in part on a location event 220. For example, if a location event 220 indicates a set of target locations for which location corresponds with location data for at least one client device, the payment server 206 may relax fraud rules for merchants associated with the target locations of the set of target locations. In this example, if the merchant of the authorization request 224 is in the set of merchants for which fraud rules have been relaxed, the transaction authorization of the authorization request 224 may be determined based on the relaxed rules. In another example, if a location event 220 indicates a set of target locations for which location does not correspond with location data for at least one client device, the payment server 206 may restrict fraud rules for merchants associated with the target locations of the set of target locations.

The authorization directions 226 may, in some embodiments, include an approval of a transaction, a denial of a transaction, a flag of a transaction for further review, and/or a request for further data. In some embodiments, a transaction system 208 may send an additional authorization request 224 or further information associated with an authorization request 224 to a payment server 206 according to authorization directions 226. Accordingly, the system may adapt a user's transaction experience to fraud rules set by a payment server 206 for an authorization request 224.

One will recognize that components of architecture are illustrated as an example. Aspects of components, such as an event estimation component 304, may be distributed across an architecture as illustrated or otherwise. For example, aspects of an event estimation component 304 may be implemented on a payment server 206 as opposed to on a client device application 204. Embodiments are not limited in this context.

Figure 4A:
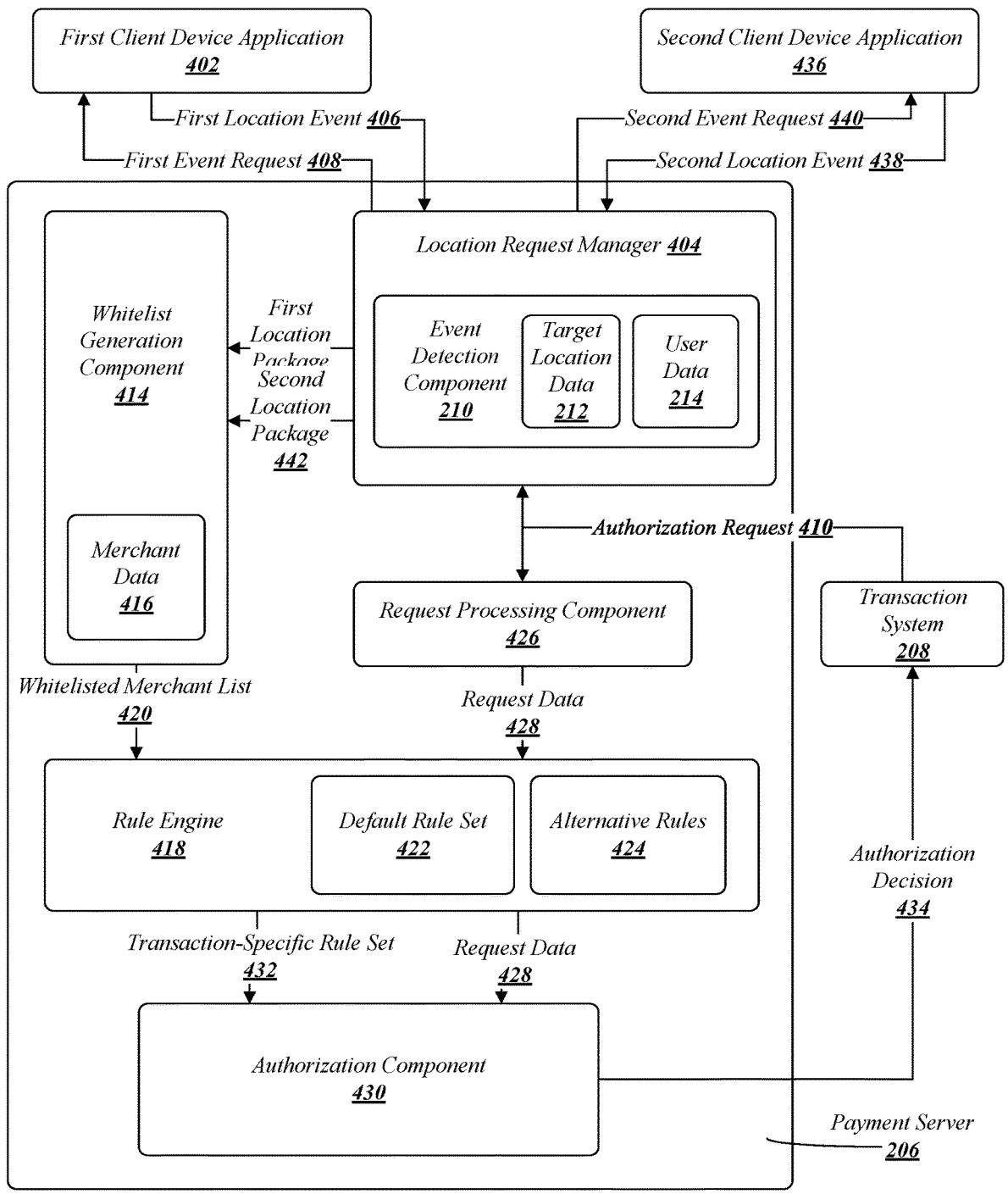
FIG. 4A-B are block diagrams depicting components of an exemplary payment server.
Figure 4B:
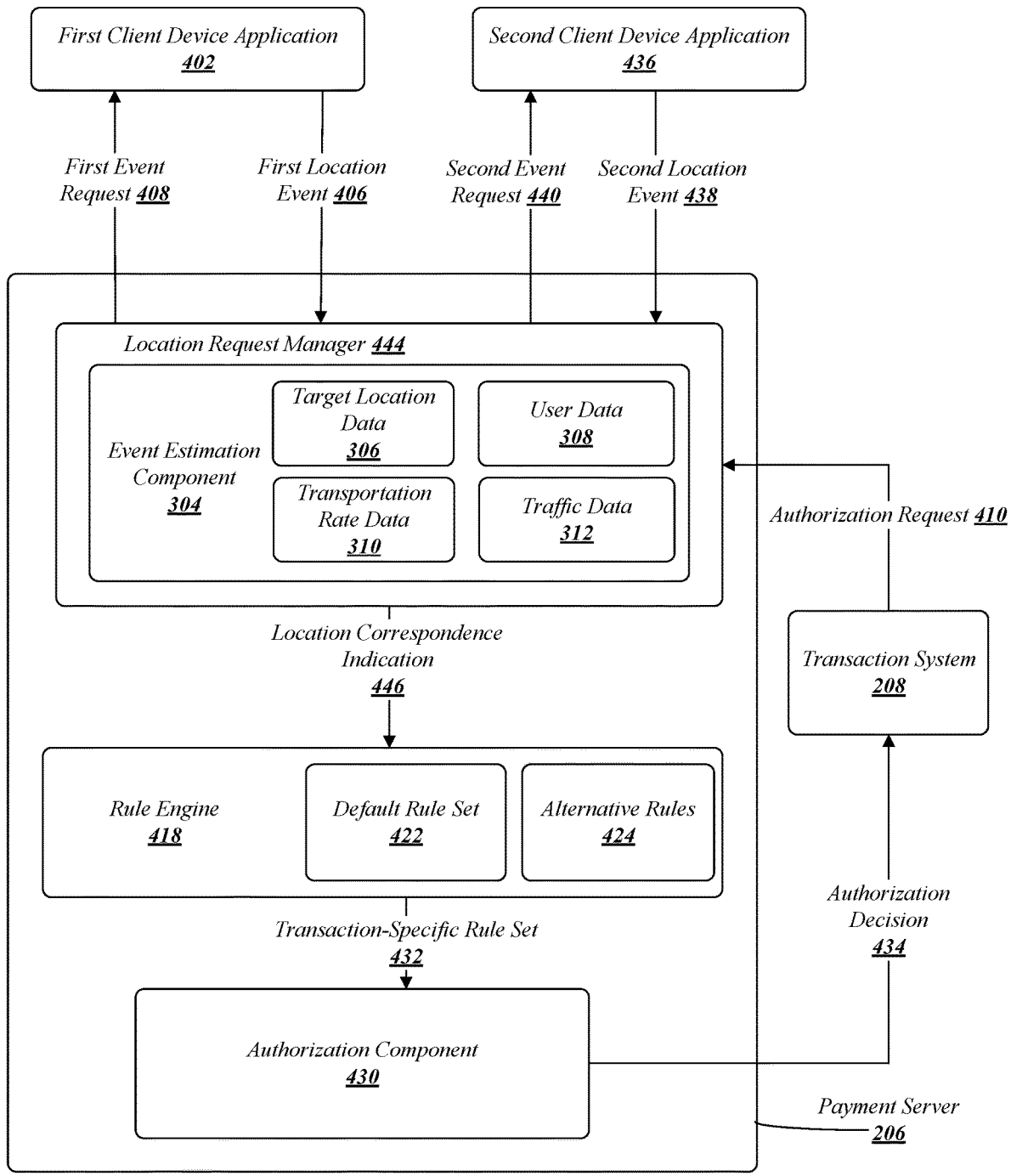

FIG. 4A-B illustrate exemplary aspects of a use of a payment server according to one or more embodiments described herein. In architecture 400A of FIG. 4A, a first client device application 402 may inform at least one payment server 206, which may communicate with at least one transaction system 208. As described herein, aspects of client device application 204, payment server 206, transaction system 208, and other components may be similar or dissimilar to components described with respect to FIG. 2 or FIG. 3. Furthermore, one will recognize that architecture 400A is illustrated as an example, but that embodiments may include any combination of any of the elements therein. Embodiments are not limited in this context.

A first client device application 402 may be a software-enabled system capable of processing location data associated with a client device. For example, a first client device application 402 may be an in-vehicle computer application associated with a vehicle, such as vehicle 102 of FIG. 1. A first client device application 402 may include one or more aspects of client device application 204 as described with respect to FIG. 2 and FIG. 3. In many embodiments, a first client device application 402 may be network-enabled. In some embodiments, a user may access aspects of a first client device application 402 via a user interface. A user may specify log in credentials via a user interface to access an account. The account may be associated with one or more client devices.

A first client device application 402 may communicate with aspects of a payment server, such as payment server 206 as described with respect to FIG. 2. A payment server 206 may authorize transactions associated with a user and maintain a set of fraud rules that are consulted to determine whether to authorize a transaction.

In some embodiments, a payment server 206 may include a location request manager 404. A location request manager 404 may send and/or receive location data associated with at least one user and/or user device, such as a first client device application 402.

In some embodiments, a location request manager 404 may include one or more aspects of an event detection component 210 and/or an event estimation component 304, as described respectively in FIGS. 2 and 3. Alternatively, or additionally, one or more aspects of an event detection component 210 and/or an event estimation component 304 may be on a payment server 206 or elsewhere and be used to support one or more functions of a location request manager 404. For simplicity, components of an event detection component 210 are illustrated as being included in a location request manager 404, but it will be understood that alternatively, or additionally, components of an event estimation component 304 may be on a payment server 206. Components may be located at or on a payment server 206 rather than a client device application 204, though, so that a system may be updated via updates to a payment server 206 rather than to a plurality of client device applications 204. Centralization of processing components may thereby improve efficiency of system updates. In many embodiments, a location request manager 404 may receive a first location event 406 from a first client device application 402. In various embodiments, a first location event 406 may comprise one or more aspects of a location event 220 and/or location data 216 as described with respect to FIG. 2. For example, a first location event 406 may be received based on a trigger event at an associated client device, such as a vehicle parking. A first location event 406 may comprise information associated with at least one user and/or client device. In several embodiments, a first location event 406 may include at least one indication of a merchant determined and/or estimated at the first client device application 402 to correspond in location with a user and/or client device. In some embodiments, a first location event 406 may comprise at least one indication of a transaction system determined and/or estimated at the first client device application 402 to have a location corresponding with the location of a user and/or client device. In some embodiments, a first location event 406 may include an indication of the location of at least one client device, merchant, and/or transaction system.

In various embodiments, a payment server 206 may receive a first location event 406 after sending a request to the first client device application 402. In many embodiments, a request from the payment server 206 to the first client device application 402 may comprise a first event request 408. A first event request 408 may include an indication of a user and/or client device. In various embodiments, a first event request 408 may comprise at least some aspects of event request 222, as described with respect to FIG. 2. In some embodiments, a location request manager 404 may send a first event request 408.

A location request manager 404 may receive an authorization request 410. An authorization request 410 may include an indication of a transaction and the transaction system 208 at which the transaction originated. In some embodiments, an authorization request 410 may include at least one indication of a user, a user account, a user profile, or a combination thereof. For example, an authorization request 410 may include a user's name, a credit card number, a debit card number, a user profile name, or other identifying information of a user. In some embodiments, an authorization request 410 may comprise data relating to the transaction. For example, the authorization request 410 may include an indication of an amount of money associated with the transaction, a type of good or service associated with the transaction, or other information useful for determining the context of the transaction. In some embodiments, a location request manager 404 may send a first event request 408 in response to receiving an authorization request 410. In some embodiments, a location request manager 404 may receive an indication that a client device associated with a first client device application 402 has been stolen, in which case the location request manager 404 may not send a first event request 408 and/or receive a first location event 406.

A location request manager 404 may send a first location package 412. In some embodiments, a location request manager 404 may generate and/or send a first location package 412 in response to receiving a first location event 406. In some embodiments, a location request manager 404 may generate and/or send a first location package 412 in response to a determination by an event detection component 210 that a location of a client device corresponds with a location of at least one target location.

A first location package 412 may include data indicating one or more merchants, transaction systems, or locations as included in or associated with data included in a first location event 406. In some embodiments, a first location package 412 may comprise one or more merchants, transaction systems, and/or locations determined to correspond with the location of a user and/or client device.

Many embodiments may include a whitelisting generation component 414, which may receive data from components of a payment server 206 such as a location request manager 404. A whitelist generation component 414 may generate or update a list of merchants including at least one merchant with a location corresponding to the location of a user and/or client device. In some embodiments, functionality described with respect to an event detection component 210 as described with respect to FIG. 2 may be performed at least in part by a whitelist generation component 414. Alternatively, or additionally, functionality described with respect to an event estimation component 304 as described with respect to FIG. 3 may be performed at least in part by a whitelist generation component 414. For example, if a first location package 412 comprises a location of a client device, a whitelist generation component 414 may determine at least one merchant for which location data may correspond with the client device location. In examples, a whitelist generation component 414 may determine correspondence of merchants with client device location by using one or more predetermined and/or calculated ranges. In some embodiments, a whitelist generation component 414 may receive a determination that a client device associated with a first client device application 402 has been stolen, wherein the determination is received in the first location package 412. Accordingly, the whitelist generation component 414 may not include any merchants in a list of merchants based on the first location package 412.

A whitelist generation component 414 may curate a list of merchants using merchant data 416. Merchant data 416 may comprise a table, database, or other memory coupled to the payment server 206 and include data associated with at least one merchant and/or transaction system tracked by the payment server 206. In many embodiments, merchant data 416 may include data concerning a location for at least one merchant and/or transaction system.

The whitelist generation component 414 may provide one or more aspects of a compiled list of merchants to a rule engine 418. A rule engine 418 may determine one or more fraud rules to be associated with one or more merchant and/or transaction system. In some embodiments, fraud rules may be associated with one or more merchant and/or transaction for a single transaction or on a transaction-by-transaction basis.

A rule engine 418 may determine at least one fraud rule for a merchant based on a list of merchants generated by a whitelist generation component 414. Specifically, a whitelist generation component 414 may send one or more aspects of a compiled list of merchants to a rule engine 418 in the form of a whitelisted merchant list 420. In some embodiments, a whitelisted merchant list 420 may be empty.

In some embodiments, a rule engine 418 may include at least one default rule set 422, which may hold one or more transaction fraud rules. In many cases, a default rule set 422 may be predetermined to accommodate a moderate degree of balance between security and convenience for transactions. In some embodiments, data in rule sets may be associated with scores relating to security and/or convenience ratings. For example, a rule in a rule set specifying a requirement for proper biometric authentication of a user may be associated with a scores representing a higher security but lower convenience than a rule in a rule set specifying a requirement for a PIN confirmation. In some embodiments, a default rule set 422 may be associated with a single score or set of scores representing the entire set. Alternatively, or additionally, a default rule set 422 may comprise multiple rules, each of which is individually associated with a single score or set of scores. In many embodiments, a default rule set may be the form of a decision tree. In some embodiments, a rule engine 418 may determine a default rule set 422 according to data indicating historic use of fraud rules. For example, a rule engine 418 may determine a default rule set 422 based on which fraud rules have been applied the most often by the rule engine 418. Embodiments are not limited in this context.

A rule engine 418 may comprise alternative rules 424 in some embodiments. Alternative rules 424 may comprise fraud rules or rule sets, each rule set comprising one or more fraud rules. In some embodiments, one or more aspects of alternative rules 424 may comprise fraud rules associated with higher or lower scores associated with security, stringency, and/or convenience than default rule set 422. In some embodiments, at least one set of rules in alternative rules 424 may be associated with a single score or set of scores representing the entire set. Alternatively, or additionally, rules in alternative rules 424 may be individually associated with a score or set of scores. In some embodiments, at least one rule of alternative rules 424 may comprise at least one alternative path through a decision tree of default fraud rules. Alternative paths may include more conservative or less conservative rules than rules of the default rule set. For example, an alternative path may include a more or less stringent set of rules than the default rule set.

A rule engine 418 may select a rule or rules from the default rule set 422 and/or alternative rules 424. The rule engine 418 may, in many embodiments, select rules based on the whitelisted merchant list 420. Additionally, or alternatively, a request processing component 426 may inform the rule engine 418.

A request processing component 426 may analyze aspects of an authorization request 410, such as data relating to a transaction and/or transaction system associated with the authorization request 410. For example, a request processing component 426 may identify data indicating a user, a transaction system, a merchant, a card number, a transaction amount, a timestamp, other associated data, or any combination thereof. In some embodiments, a payment server 206 may receive an authorization request 410 at a request processing component 426. The request processing component 426 may send one or more aspects of data from the authorization request 410 to a location request manager 404. In other embodiments, a location request manager 404 may receive an authorization request 410 and send aspects of data identified from the authorization request 410 to the request processing component 426. In many embodiments, a request processing component 426 may send one or more aspects of data identified from an authorization request 410 to a rule engine 418 as part of request data 428. In some embodiments, a request processing component 426 may receive and/or recognize an indication received by the payment server 206 that a client device of a user and/or account associated with an authorization request 410 has been stolen. In embodiments, the request processing component 426 may include a flag in the request data 428 indicating that a client device has been stolen.

Request data 428 may include, in many embodiments, information relating to a transaction associated with an authorization request 410. In many embodiments, request data 428 may comprise a merchant associated with the authorization request 410. In some embodiments, request data 428 may include an indication of and/or a pointer to a transaction system 208. Additionally, or alternatively, request data 428 may comprise additional information relating to the authorization request 410, such as a transaction amount.

In many embodiments, a rule engine 418 may select rules based on a comparison of aspects of request data 428 to whitelisted merchant list 420. For example, a rule engine 418 may identify merchant included in request data 428 as a merchant in whitelisted merchant list 420. In this example, the rule engine 418 may select fraud rules that have a score or set of scores indicating greater convenience than a default rule set. In another example, a rule engine 418 may not identify a merchant included in request data 428 as a merchant in whitelisted merchant list 420. In this example, a rule engine 418 may select fraud rules that have a score or set of scores indicating greater security than a default rule set. For example, a default rule of a requirement for a PIN confirmation may be replaced by an alternative rule of a requirement for biometric confirmation of a user for the transaction of the authorization request 410. In some examples, a rule engine 418 may select rules entirely from the default rule set. One will recognize that a rule engine 418 may generate a custom set of rules based on the comparison of the request data 428 to a whitelisted merchant list 420, for example, by maintaining aspects of a default rule set 422 but supplementing and/or replacing aspects with alternative rules 424. In this manner, a rule engine 418 may customize fraud rules for an authorization request 410. In some embodiments, a rule engine 418 may restrict application of one or more rules based on a payment server 206's receipt of an indication of a stolen client device.

A rule engine 418 may provide an authorization component 430 with selected rules. In many embodiments, a rule engine 418 may send a transaction-specific rule set 432 containing one or more selected rules to an authorization component 430. The authorization component 430 may apply fraud rules to transaction data. In some embodiments, the fraud rules may comprise transaction approval rules in the form of a decision tree. A transaction-specific rule set 432 may contain rules selected with respect to request data 428. In many embodiments, aspects of request data 428 may be provided to the authorization component 430, either via the rule engine 418, the request processing component 426, the location request manager 404, the transaction system 208, or via a combination thereof. An authorization component 430 may thus apply a transaction-specific rule set 432 to related request data 428. The authorization component 430 may determine whether aspects of request data 428 meet requirements of a transaction-specific rule set. Accordingly, the authorization component 430 may determine an authorization decision 434, which may be provided to the transaction system 208 associated with the authorization request 410. In some embodiments, an authorization component 430 may receive an indication from a first client device application 402 of a user's express approval or denial of a transaction and generate an authorization decision 434 based on the indication.

An authorization decision 434 may include directions to approve a transaction, deny a transaction, and/or flag a transaction for further review. In some embodiments, an authorization decision 434 may include an indication of transaction approval only if all requirements of a transaction-specific rule set 432 are met by request data 428. In some embodiments, an authorization decision 434 may include an indication of transaction approval despite one or more requirement of a transaction-specific rule set 432 not being met by request data 428. In some embodiments, a flag for review may be communicated to the transaction system 208, for example, as part of authorization decision 434, or to a receptacle for communications accessible by one or more systems or human employees associated with the payment server 206. In some embodiments, an authorization decision 434 may include a denial of a transaction at a transaction system 208 based on one or more requirements of a transaction-specific rule set 432 not being met by request data 428. In various embodiments, an authorization decision 434 may be based at least in part on a flag in the request data 428 that a client device has been stolen.

In some embodiments, the authorization decision 434 may include a request for further data from the transaction system needed to determine authorization. In some embodiments, the authorization decision 434 may include a tentative denial of a transaction pending the receipt of further data by the payment server 206, at which point authorization may be re-determined based upon the received additional data. For example, in a case where fraud rules have been restricted for an authorization request 410, an authorization decision 434 may comprise a request for express approval of a transaction by the user, for example, via input into a transaction system 208 and/or client device application 204 interface. In another example, an authorization decision 434 may include a request for a PIN for the user to be sent to the payment server 206 by the transaction system 208. In some embodiments, a transaction system 208 may send an additional authorization request 410 or further information associated with an authorization request 410 to at least one component of a payment server 206 according to an authorization decision 434. The payment server 206 may then use the additional authorization request 410 or further information to determine a further authorization decision 434.

In one or more embodiments described herein, a payment server 206 may receive location data from multiple client device applications and base the generation of a whitelisted merchant list 420 on the combination of location data received. For example, a location request manager 404 may communicate with a second client device application 436 in addition to the first client device application 402. A second client device application 436 may comprise components as described with respect to client device application 204 of one or both of FIG. 2 and FIG. 3, for example. In various embodiments, a second client device application 436 may be associated with a second client device associated with the same user as the client device associated with the first client device application 402. For example, the second client device application may be associated with a mobile phone 136 of a user. In several embodiments, a common user account and/or associated accounts may access both first client device application 402 and a second client device application 436.

In some embodiments, a second client device application 436 may provide a second location event 438 to a location request manager 404 of a payment server 206. In various embodiments, the second device application 436 may provide the second location event 438 after receiving a second event request 440 from the payment server 206 or the location request manager 404. For example, the second location event 438 may be sent in response to the second client device application 436 receiving the second event request. In some embodiments, a location request manager 404 may receive an indication that a client device associated with a second client device application 436 has been stolen, in which case the location request manager 404 may not send a second event request 440 and/or receive a second location event 438. In some embodiments, an authorization component 430 may receive an indication from a second client device application 436 indicating a user's express approval or denial of a transaction and generate an authorization decision 434 based on the indication.

In various embodiments, a second location event 438 may comprise one or more aspects of a location event 220 as described with respect to FIG. 2. A second location event 438 may comprise information associated with at least one user and/or client device. In several embodiments, a second location event 438 may include at least one indication of a merchant determined and/or estimated at the second client device application 436 to correspond in location with a user and/or client device. In some embodiments, a second location event 438 may comprise at least one indication of a transaction system determined and/or estimated at the second client device application 436 to have a location corresponding with the location of a user and/or client device. In some embodiments, an indication of the location of at least one client device may be included in a second location event 438. In various embodiments, at least one indication of the location of at least one merchant and/or transaction system may be included in the second location event 438.

A second event request 440 may comprise an indication of a user and/or client device, in many embodiments. In various embodiments, a second event request 440 may comprise at least some aspects of event request 222, as described with respect to FIG. 2. In some embodiments, a location request manager 404 may send a second event request 440.

A payment server 206 may communicate with multiple client device applications in parallel or in series. For example, a location request manager 404 may communicate with a first client device application 402 and a second client device application 436 by sending a first event request 408 and a second event request 440 at the same or at different times. As a further example, a location request manager 404 may receive a first location event 406 and a second location event 438 at the same or different times. In some embodiments, a location request manager 404 may send one or more event requests to client device applications based on receiving an authorization request 410. In some embodiments, a location request manager 404 may determine which event requests to provide based on user data associating a user of an authorization request 410 with one or more client devices and/or client device applications. A location request manager may access user data from a local or separate table, database, or other memory coupled to the payment server.

Based on location events received in addition to the first location event 406 and/or processing by a location request manager 404, a location request manager 404 may provide additional location packages to the whitelist generation component 414. For example, a location request manager 404 may provide a second location package 442 to the whitelist generation component 414 based on the second location event 438.

A whitelist generation component 414 may determine the correspondence of location data from multiple location packages. In various embodiments, a whitelist generation component 414 may generate a whitelisted merchant list 420 based upon multiple received location packages. For example, a whitelist generation component 414 may curate a whitelisted merchant list 420 based on a first location package 412 and a second location package 442 having corresponding and/or co-located positions. In another example, a whitelist generation component 414 may determine a first location package 412 and a second location package 442 to not have corresponding locations. In this example, a whitelisted merchant list 420 may be empty. For example, with respect to FIG. 1, a whitelist generation component 414 may determine that a vehicle 102 associated with the user is within a range 134 of merchant 114. In some cases, the whitelist generation component 414 may whitelist at least one merchant within a range 130, a range 132, a range 134 and/or a range centered on vehicle 102. However, if a whitelist generation component 414 determines that a mobile phone 136 associated with the user is located not at merchant 114, but at merchant 112, the whitelist generation component 414 may not whitelist any merchants. Alternatively, in this example, the whitelist generation component 414 may populate a whitelisted merchant list 420 but flag the list and/or one or more merchants so that an authorization decision 434 may be marked for review. In these examples, embodiments may account for cases in which a user device and/or payment card has been stolen from a user, for example.

In architecture 400B of FIG. 4B, a first client device application 402 may inform at least one payment server 206, which may communicate with at least one transaction system 208. As described herein, aspects of client device application 204, payment server 206, transaction system 208, and other components may be similar or dissimilar to components described with respect to FIG. 2 or FIG. 3. In many embodiments, components may include one or more aspects of components described with respect to FIG. 4A. Furthermore, one will recognize that architecture 400B is illustrated as an example, but that embodiments may include any combination of any of the elements therein. Embodiments are not limited in this context.

A first client device application 402 may communicate with aspects of a payment server, such as payment server 206 as described herein.

In some embodiments, a payment server 206 may include a location request manager 444. Aspects of a location request manager 444 may send and/or receive location data associated with at least one user and/or user device. For example, a location request manager 444 may send and/or receive communications from a first client device application 402. In some embodiments, a location request manager may include one or more of an event detection component 210 or an event estimation component 304, as described above. For simplicity, components of an event estimation component 304 are illustrated with respect to a location request manager 444, but it will be understood that components of an event detection component 210 and/or an event estimation component 304 may be entirely or partially located on a payment server 206 and/or a client device application.

In many embodiments, a location request manager 444 may receive a first location event 406 from a first client device application 402. In various embodiments, a payment server 206 may receive a first location event 406 after sending a request to the first client device application 402. In various embodiments, a first location event 406 may comprise one or more aspects of a location event 220 and/or location data 216 as described with respect to FIG. 2. For example, a first location event 406 may be received based on a trigger event at an associated client device, such as a vehicle parking. In many embodiments, a request from the payment server 206 to the first client device application 402 may comprise a first event request 408. In various embodiments, a location request manager 444 may send a first event request 408.

A location request manager 444 may receive an authorization request 410. In some embodiments, a location request manager 444 may send a first event request 408 in response to receiving an authorization request 410.

Based on the authorization request 410 and at least one location event, such as first location event 406 and/or an event determined at a location request manager 444, a location request manager 444 may generate a location correspondence indication 446. A location correspondence indication 446 may include an indication of the correspondence and/or lack of correspondence between locations associated with the authorization request 410 and at least one location event. In some embodiments, a location request manager 444 may determine the correspondence and/or lack of correspondence of locations based on predetermined and/or estimated ranges. Ranges may be determined by methods and/or components such as those described above. In some embodiments, locations may be directly compared without the use of ranges.

Various embodiments may determine a correspondence score via the location request manager 444. A correspondence score may be a numerical or other indication of the proximity and/or travel time between two or more locations. A correspondence score may comprise a single number or other indication, such as a percentage, or multiple numbers or other indications. A location correspondence indication 446 may include one or more aspects of a correspondence score. In many embodiments, a location correspondence indication 446 may be specific to a transaction associated with an authorization request 410.

The location request manager 444 may provide a location correspondence indication 446 to a rule engine 418. A rule engine 418 may determine one or more fraud rules to be associated with one or more merchant and/or transaction system. In some embodiments, fraud rules may be associated with one or more merchant and/or transaction for a single transaction or be otherwise determined on a transaction-by-transaction basis.

In some embodiments, a rule engine 418 may comprise at least one default rule set 422 and/or alternative rules 424, as described above with respect to FIG. 4A. A rule engine 418 may select a rule or rules from the default rule set 422 and/or alternative rules 424. The rule engine 418 may select rules based on a location correspondence indication 446. For example, a rule engine 418 may identify a location correspondence indication 446 below a threshold and then select alternative rules 424 with higher requirements for transaction authentication. In another example, a rule engine 418 may identify a location correspondence indication 446 above a threshold and then select alternative rules 424 with lower requirements for transaction authentication. In some examples, a rule engine 418 may select rules entirely from the default rule set. A rule engine 418 may generate a custom set of rules based on the location correspondence indication 446, for example, by maintaining aspects of a default rule set 422 but supplementing it and/or replacing aspects of it with alternative rules 424. As the location correspondence indication 446 may be specific to a transaction, one or more rules selected by a rule engine 418 may be selected specifically with respect to the transaction, such as the transaction associated with an authorization request 410. In some embodiments, a rule engine 418 may apply rules based on an indication of a conveyance of a user. For example, a rule engine 418 may select more conservative rules than a default rule set in response to detecting that a transaction is an in-person transaction and that a conveyance associated with a user is located at the home of a user.

A rule engine 418 may provide an authorization component 430 with selected rules. In many embodiments, a rule engine 418 may send a transaction-specific rule set 432 containing one or more selected rules to an authorization component 430. The authorization component 430 may apply fraud rules to transaction data. The authorization component 430 may determine whether aspects of an authorization request 410 meet requirements of a transaction-specific rule set. The authorization component 430 may access one or more aspects of an authorization request 410 by one or more aspects of a payment server 206, such as a location request manager 444. In some embodiments, a location correspondence indication 446 and/or a transaction-specific rule set 432 may carry aspects of an authorization request 410, enabling the authorization component 430 to analyze aspects of the authorization request 410 by the transaction-specific rule set 432. Accordingly, the authorization component 430 may determine an authorization decision 434 and provide it to the transaction system 208 associated with the authorization request 410.

An authorization decision 434 may include directions to approve, deny, and/or flag a transaction, as described herein. In some embodiments, the authorization decision 434 may comprise a request for further data from the transaction system needed to determine authorization. In some embodiments, a transaction system 208 may send an additional authorization request 410 or further information associated with an authorization request 410 to at least one component of a payment server 206 according to an authorization decision 434, which may be used to determine a further authorization decision 434 to be sent to the transaction system 208.

In one or more embodiments described herein, a payment server 206 may receive location data from multiple client device applications. The payment server 206 may base the generation of a location correspondence indication 446 on the combination of location data received. For example, a location request manager 444 may communicate with a second client device application 436 in addition to the first client device application 402. A second client device application 436 may comprise components as described with respect to client device application 204 of one or both of FIG. 2 and FIG. 3, for example. In various embodiments, a second client device application 436 may be associated with a second client device associated with the same user as the client device associated with the first client device application 402. A common user account and/or associated accounts may access both first client device application 402 and a second client device application 436.

In some embodiments, a second client device application 436 may provide a second location event 438 to a location request manager 444 of a payment server 206. The second device application 436 may supply the second location event 438 after receiving a second event request 440 from the payment server 206 or the location request manager 444. For example, the second location event 438 may be sent in response to the second client device application 436 receiving the second event request 440.

In various embodiments, a second location event 438 may comprise one or more aspects of a location event 220 as described with respect to FIG. 2. A second event request 440 may include an indication of a user and/or client device. In various embodiments, a second event request 440 may comprise at least some aspects of event request 222, as described with respect to FIG. 2. In some embodiments, a location request manager 444 may send a second event request 440.

A payment server 206 may communicate with multiple client device applications in parallel or in series. For example, a location request manager 444 may communicate with a first client device application 402 and a second client device application 436 by sending a first event request 408 and a second event request 440 at the same or at different times. As a further example, a location request manager 444 may receive a first location event 406 and a second location event 438 at the same or different times. In some embodiments, a location request manager 444 may send one or more event requests to client device applications based on receiving an authorization request 410. In some embodiments, the location request manager 444 may determine which event requests to provide based on user data associating a user of an authorization request 410 with one or more client devices and/or client device applications. The location request manager 444 may access user data via a local or separate table, database, or other memory coupled to the payment server.

A location request manager 444 may determine the correspondence of location data from multiple location packages. For example, the location request manager 444 may generate a location correspondence indication 446 based on a first location package 412 and a second location package 442 having corresponding locations. In another example, a location request manager 444 may determine a first location package 412 and a second location package 442 to not have corresponding locations, which may be indicated by a location correspondence indication 446. In some embodiments, a location correspondence indication 446 may comprise a flag or other indication to prompt further review. The flag may be passed to an authorization decision 434, in some embodiments, or used to generate a review flag as part of an authorization decision 434.

Figure 5A:
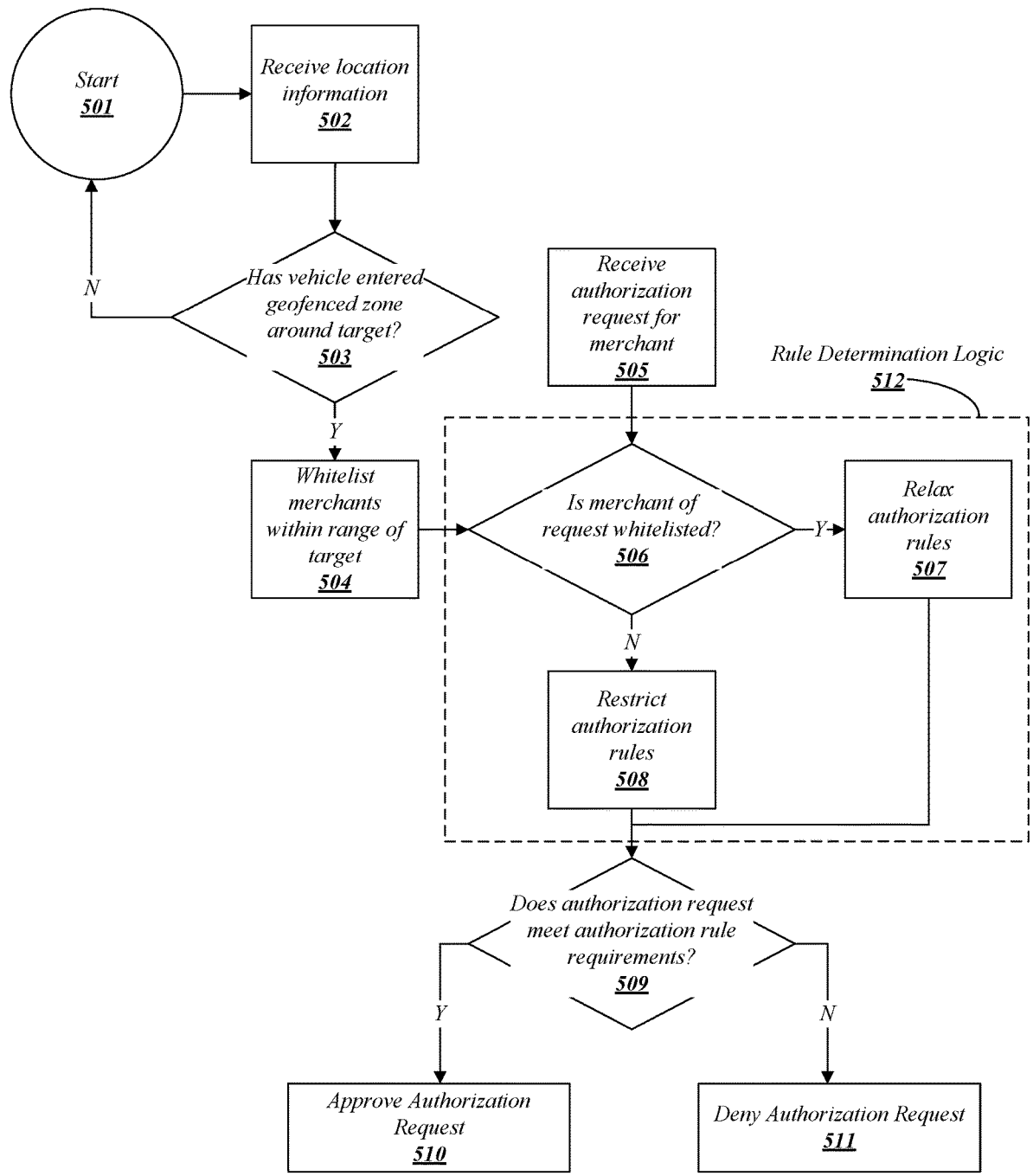
FIG. 5A-D are flowcharts depicting transaction authentication techniques according to exemplary embodiments.

FIG. 5A illustrates exemplary aspects of a logic flow according to one or more embodiments described herein. Logic flow 500A includes transaction logic for determining an authorization decision for a transaction according to location data received at a client device application, such as client device application 204, wherein the client device application includes an in-vehicle computer application. For example, an authorization decision may comprise aspects of authorization directions 226 and/or authorization decision 434. A logic flow may comprise one or more aspects of 500A. Embodiments are not limited in this context.

A logic flow may begin at block 501. At block 502, location information may be received. For example, location information may be received at a client device application comprising an in-vehicle computer application. In some embodiments, location may be received as in block 502 from a location service, such as location service 202.

At block 503, at least one disclosed component may determine whether a vehicle has entered a geofenced zone around a target. In various embodiments, an event detection component 210 may perform logic at block 503. A geofenced zone around a target may comprise a predetermined and/or estimated range as disclosed herein.

If, at block 503, a vehicle is not determined to have entered a geofenced zone around a target, the logic may return to the start point at block 501, from which additional location information may be received at block 502.

If, at block 503, a vehicle is determined to have entered a geofenced zone around a target, the logic may proceed to block 504. At block 504, logic may whitelist merchants within range of the target. The range, in some embodiments, may coincide with the geofenced zone of block 503. In other embodiments, the range may be independently and/or separately determined from the geofenced zone. A payment server 206 may perform logic of block 504, such as by a whitelist generation component 414. In some embodiments, information from merchant data 416 may inform logic at block 504.

A system may receive an authorization request for a merchant at block 505. The authorization request may be associated with a transaction involving the merchant. For example, the merchant may be a party of the transaction such as a seller. In some embodiments, the authorization request of block 505 may be an authorization request 410. One or more components of a payment server 206 may perform logic of block 505.

Embodiments may perform logic of block 504 and block 505 concurrently or one after the other. Either logic of block 504 or of block 505 may be performed first. When logic of block 504 and block 505 has been completed, the flow may continue to block 506.

At block 506, logic may determine whether a merchant of the authorization request of block 505 has been whitelisted by logic of block 504. In various embodiments, the logic of block 506 may comprise comparing aspects of request data 428 or of an authorization request 410 with a whitelisted merchant list 420.

If, at block 506, a merchant of the request is determined to have been included in the whitelist generated at block 504, the logic may proceed to block 507. At block 507, logic may relax fraud rules. In various embodiments, a relaxation of fraud rules may comprise selecting at least one alternative fraud rule, such as from alternative rules 424, instead of at least one rule from a default rule set 422, wherein the at least one alternative rule has a lower security threshold than the at least one default rule. In embodiments, rules may be associated with security scores.

If, at block 506, a merchant of the request is determined to have not been included in the whitelist generated at block 504, the logic may proceed to block 508. At block 508, logic may restrict fraud rules. In various embodiments, a restriction of fraud rules may comprise selecting at least one alternative fraud rule, such as from alternative rules 424, instead of at least one rule from a default rule set 422, wherein the at least one alternative rule has a higher security threshold than the at least one default rule. In embodiments, rules may be associated with security scores.

In various embodiments, logic of block 506, block 507, and block 508 may be comprised by rule determination logic 512. A rule engine 418 may perform one or more aspects of rule determination logic 512.

Regarding aspects of rule determination logic 512, block 507 and block 508 are alternative logic paths. However, in some embodiments, a data flow may engage with both block 507 and block 508 within the same use case. For example, block 507 and block 508 may be performed in parallel or in series, resulting in certain aspects of a default rule set being relaxed while others are restricted.

Additionally, or alternatively, block 507 and/or block 508 may relax and/or restrict fraud rules according to convenience scores associated with rules. Accordingly, security and convenience benefits may be adjusted for a set of rules based on the correspondence of a merchant of a request with a whitelist of merchants.

From block 507 and/or 508, logic may proceed to block 509. At block 509, a determination may be made as to whether an authorization request meets authorization requirements. In many embodiments, the authorization request may be the authorization request of block 505. The authorization request may be authorization request 410. Authorization requirements may be determined by rules selected by aspects of rule determination logic 512.

If, at block 509, logic determines that an authorization request meets authorization requirements, logic may proceed to block 510. At block 510, logic may approve an authorization request, such as authorization request 410. In some embodiments, approval may be performed at a payment server 206. In some embodiments, payment server 206 may send an indication of approval and/or directions for approval to a transaction system 208. For example, an authorization decision 434 may comprise an indication of approval for a transaction. In some embodiments, an authorization request may be approved or marked for approval, but a flag for review may be included in the indication.

If, at block 509, logic determines that an authorization request does not meet authorization requirements, logic may proceed to block 511. At block 511, logic may deny an authorization request, such as authorization request 410. In some embodiments, a payment server 206 may deny an authorization request. In some embodiments, a payment server 206 may send an indication of denial and/or directions for denial to a transaction system 208, such as part of an authorization decision 434.

Figure 5B:
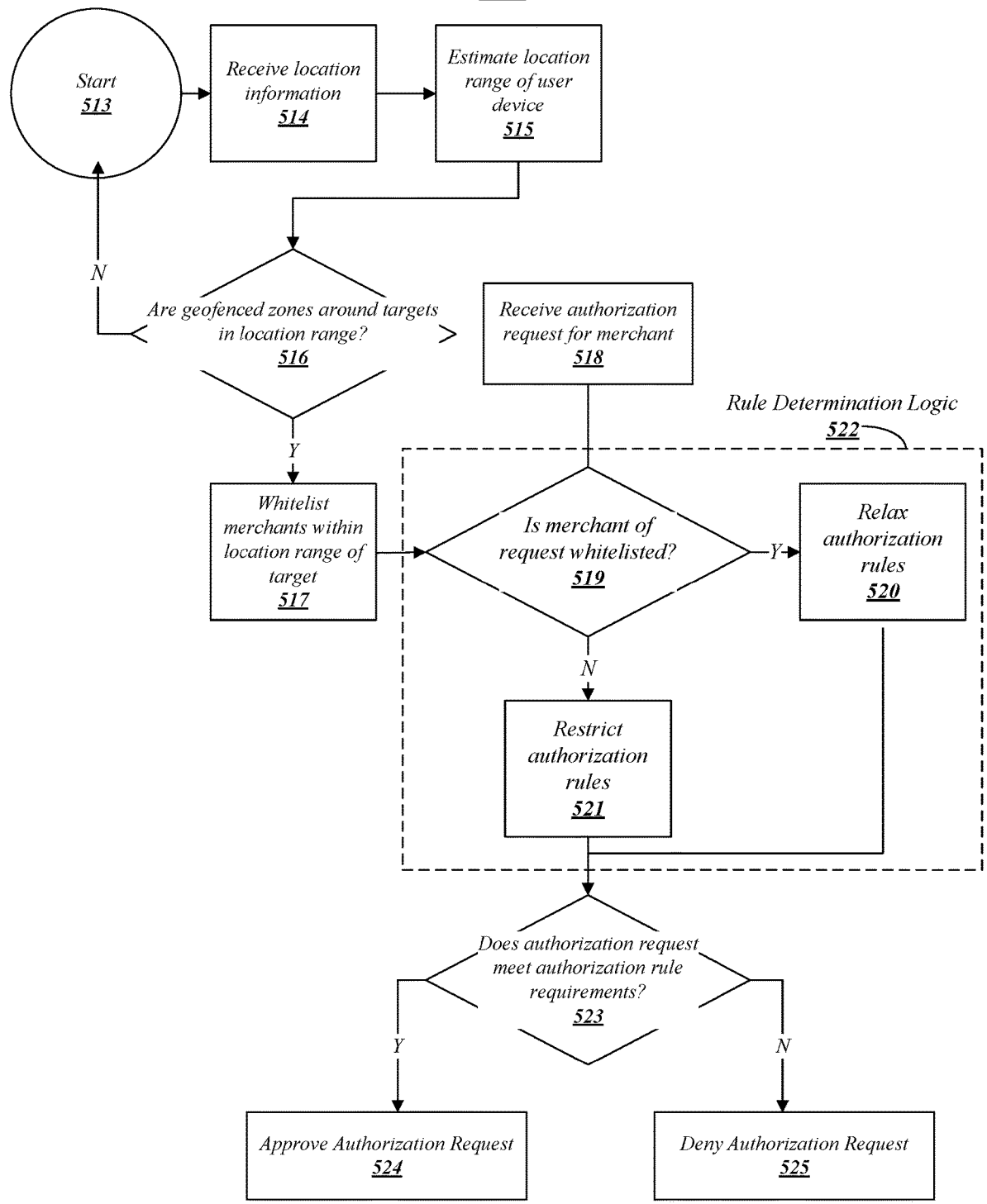

FIG. 5B illustrates exemplary aspects of a logic flow according to one or more embodiments described herein. Logic flow 500B includes logic for determining an authorization decision for a transaction according to location data received at a client device application, such as client device application 204. For example, an authorization decision may include aspects of authorization directions 226 and/or authorization decision 434. A logic flow may comprise one or more aspects of 500B. Embodiments are not limited in this context.

A logic flow may begin at block 513. At block 514, embodiments may receive location information. For example, a client device application 204 may receive location information. In some embodiments, the location information and/or client device application 204 may be associated with a mobile phone 136. In some embodiments, location may be received as in block 514 from a transportation service datastore, such as transportation service datastore 302. From block 514, logic may proceed to block 515.

At block 515, an estimation may be made of a location range for a user device associated with the location information of block 514. In various embodiments, one or more components of an event estimation component 304 may perform logic of block 515. From block 515, logic may continue to block 516.

At block 516, at least one disclosed component may determine whether at least one geofenced zone around a target location corresponds with the location range estimated in block 515. Correspondence may be based on complete or partial overlap of at least one geofenced zone with the estimated range. In various embodiments, an event estimation component 304 may perform logic at block 516.

If, at block 516, no geofenced zone around a target location is determined to correspond with an estimated location range, the logic may return to the start point at block 513.

If, at block 516, a geofenced zone around a target location is determined to correspond with an estimated location range, the logic may proceed to block 517. At block 517, logic may whitelist merchants associated with targets of geofenced zones corresponding with the estimated range of the target. Logic of block 517 may, in some embodiments, be performed at a payment server 206, such as by a whitelist generation component 414. Merchant data 416 may inform logic at block 517.

In some embodiments, logic may proceed directly from block 515 to block 517. For example, a whitelist of merchants may be automatically filled with merchants within the estimated location range of the target. If there are no merchants meeting the location criteria, the whitelist of merchants may be empty. In some embodiments, logic may still proceed to block 519 if no merchants are included in the whitelist generated at block 517.

A system may receive an authorization request for a merchant at block 518. The authorization request may be associated with a transaction involving the merchant. In some embodiments, the authorization request of block 518 may be an authorization request 410. One or more components of a payment server 206, such as location request manager 404, request processing component 426, and/or location request manager 444, may perform logic of block 518.

Logic of block 517 and block 518 may be performed concurrently or one after the other. Either logic of block 517 or of block 518 may be performed first. When logic of block 517 and block 518 has been completed, the flow may continue to block 519.

At block 519, logic may determine whether a merchant of the authorization request of block 518 has been whitelisted by logic of block 517. In various embodiments, the logic of block 519 may compare aspects of request data 428 or of an authorization request 410 with a whitelisted merchant list 420.

If, at block 519, a merchant of the request is determined to be in the whitelist generated at block 517, the logic may continue to block 520. At block 520, logic may relax fraud rules. In various embodiments, a relaxation of fraud rules may include selecting at least one alternative fraud rule, such as from alternative rules 424, instead of at least one rule from a default rule set 422, wherein the at least one alternative rule has a lower security threshold than the at least one default rule. In embodiments, rules may be associated with security scores.

If, at block 519, a merchant of the request is determined to not be included in the whitelist generated at block 517, the logic may continue to block 521. At block 521, logic may restrict fraud rules. In various embodiments, a restriction of fraud rules may comprise selecting at least one alternative fraud rule, such as from alternative rules 424, instead of at least one rule from a default rule set 422, wherein the at least one alternative rule has a higher security threshold than the at least one default rule. In embodiments, rules may be associated with security scores. In some examples, an empty whitelist from block 517 may cause logic to proceed from block 519 to block 521.

In various embodiments, logic of block 519, block 520, and block 521 may be comprised by rule determination logic 522. A rule engine 418 may perform one or more aspects of rule determination logic 522.

Regarding aspects of rule determination logic 522, block 520 and block 521 are alternative logic paths. However, in some embodiments, a data flow may engage with both block 520 and block 521 within the same use case. For example, block 520 and block 521 may be performed in parallel or in series, resulting in certain aspects of a default rule set being relaxed while others are restricted.

Additionally, or alternatively, block 520 and/or block 521 may relax and/or restrict fraud rules according to convenience scores associated with rules. Accordingly, security and convenience benefits may be adjusted for a set of rules based on the correspondence of a merchant of a request with a whitelist of merchants.

From block 520 and/or block 521, logic may proceed to block 523. At block 523, embodiments may determine whether an authorization request meets authorization requirements. In many embodiments, the authorization request may be the authorization request of block 518. The authorization request may be authorization request 410. Authorization requirements may be determined by rules selected by aspects of rule determination logic 522.

If, at block 523, logic determines that an authorization request meets authorization requirements, logic may proceed to block 524. At block 524, logic may approve an authorization request, such as authorization request 410. In some embodiments, a payment server 206 may approve an authorization request. In some embodiments, a payment server may send an indication of approval and/or directions for approval to a transaction system 208, such as in an authorization decision 434.

If, at block 523, logic determines that an authorization request does not meet authorization requirements, logic may proceed to block 525. At block 525, logic may deny an authorization request, such as authorization request 410. In some embodiments, a payment server 206 may deny an authorization request. In some embodiments, a payment server 206 may send an indication of denial and/or directions for denial to a transaction system 208. For example, an authorization decision 434 may comprise an indication of denial for a transaction. In some embodiments, an authorization request may be denied or marked for denial, but a flag for review may be generated and/or included with the indication.

Figure 5C:
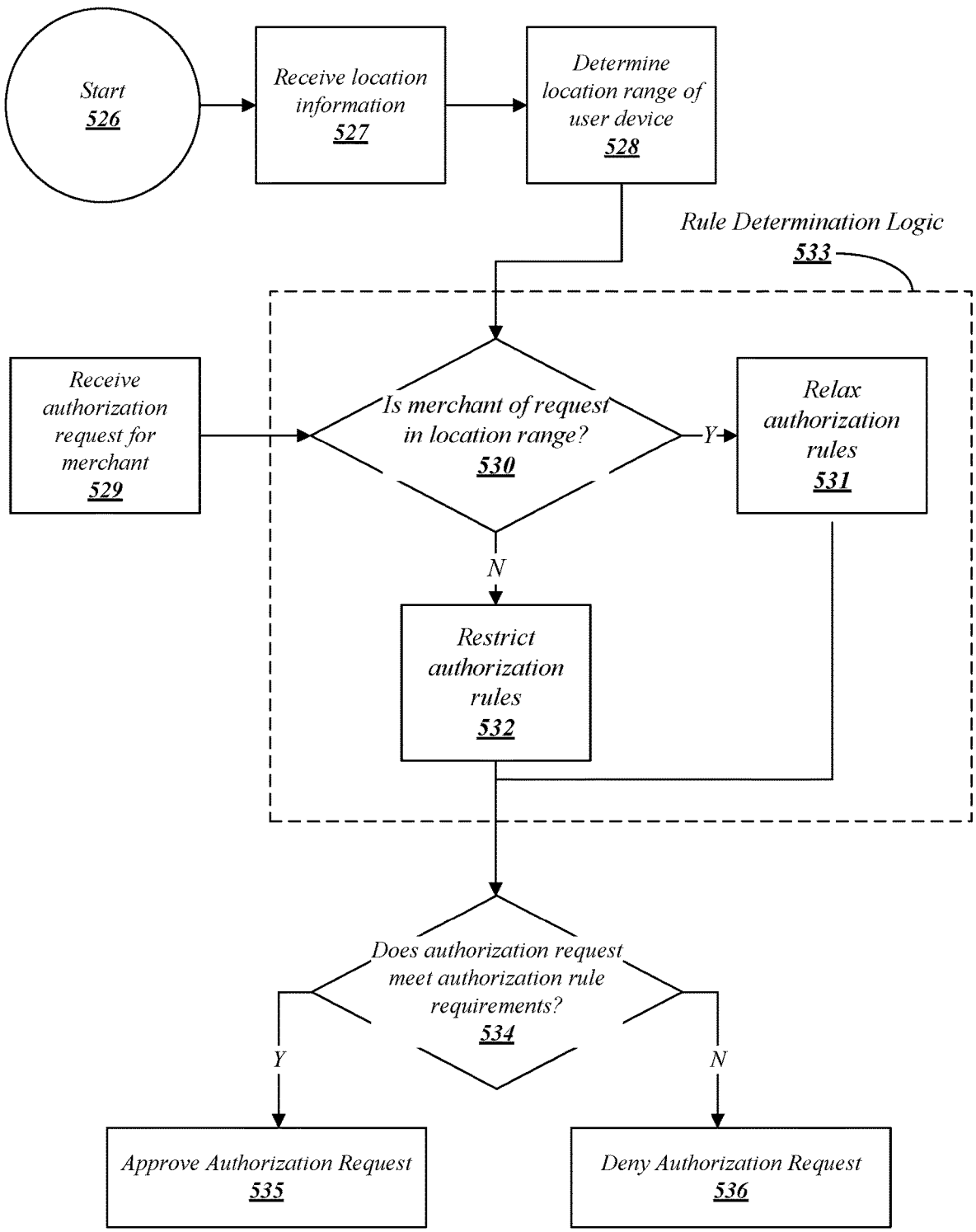

FIG. 5C illustrates exemplary aspects of a logic flow according to one or more embodiments described herein. Logic flow 500C includes logic to determine an authorization decision for a transaction according to location data received at a client device application, such as client device application 204. For example, an authorization decision may comprise aspects of authorization directions 226 and/or authorization decision 434. A logic flow may comprise one or more aspects of 500C. Embodiments are not limited in this context.

A logic flow may begin at block 526. At block 527, embodiments may receive location information. For example, a client device application 204 may receive location information. In some embodiments, the location information and/or client device application 204 may be associated with a client device, such as vehicle 102 or a mobile phone 136. In some embodiments, location may be received as in block 527 from a location service, such as location service 202. From block 527, logic may proceed to block 528.

At block 528, a location range may be determined for a user device based on the location information of block 527. One or more components of a client device application 204, such as event detection component 210, may perform logic of block 528.

A system may receive an authorization request for a merchant at block 529. The authorization request may be associated with a transaction involving the merchant. In some embodiments, the authorization request of block 529 may be an authorization request 410. One or more components of a payment server 206, such as location request manager 404, request processing component 426, and/or location request manager 444, may perform logic of block 529.

Logic of block 528 and block 529 may be performed concurrently or one after the other. Either logic of block 528 or of block 529 may be performed first. When logic of block 528 and block 529 has been completed, the flow may continue to block 530.

At block 530, logic may determine whether a merchant of the authorization request of block 529 is within the determined range of block 528. In various embodiments, a location request manager 444 may perform logic of block 530.

If, at block 530, a merchant of the request is determined to be within the determined range of block 528, the logic may proceed to block 531. At block 531, logic may relax fraud rules. In various embodiments, a relaxation of fraud rules may comprise selecting at least one alternative fraud rule, such as from alternative rules 424, instead of at least one rule from a default rule set 422, wherein the at least one alternative rule has a lower security threshold than the at least one default rule. In embodiments, rules may be associated with security scores.

If, at block 530, a merchant of the request is determined to not be within the determined range of block 528, the logic may proceed to block 532. At block 532, logic may restrict fraud rules. In various embodiments, a restriction of fraud rules may comprise selecting at least one alternative fraud rule, such as from alternative rules 424, instead of at least one rule from a default rule set 422, wherein the at least one alternative rule has a higher security threshold than the at least one default rule. In embodiments, rules may be associated with security scores.

In various embodiments, logic of block 530, block 531, and block 532 may be comprised by rule determination logic 533. A rule engine 418 may perform one or more aspects of rule determination logic 533.

Regarding aspects of rule determination logic 533, block 531 and block 532 are alternative logic paths. However, in some embodiments, a data flow may engage with both block 531 and block 532 within the same use case. For example, block 531 and block 532 may be performed in parallel or in series, resulting in certain aspects of a default rule set being relaxed while others are restricted. Additionally, or alternatively, block 531 and/or block 532 may relax and/or restrict fraud rules according to convenience scores associated with rules.

From block 531 and/or block 532, logic may proceed to block 534. At block 534, a determination may be made as to whether an authorization request meets authorization requirements. In many embodiments, the authorization request may be the authorization request of block 529. The authorization request may be authorization request 410. Authorization requirements may be determined by rules selected by aspects of rule determination logic 533.

If, at block 534, logic determines that an authorization request meets authorization requirements, logic may proceed to block 535. At block 535, logic may approve an authorization request, such as authorization request 410. In some embodiments, a payment server 206 may approve an authorization request. In some embodiments, a payment server 206 may send an indication of approval and/or directions for approval to a transaction system 208, such as part of an authorization decision 434. In some embodiments, an authorization request may be approved or marked for approval, but a flag for review may be included in the indication. Embodiments are not limited in this context.

If, at block 534, logic determines that an authorization request does not meet authorization requirements, logic may proceed to block 536. At block 536, logic may deny an authorization request, such as authorization request 410. In some embodiments, a payment server 206 may deny an authorization request. In some embodiments, a payment server 206 may send an indication of denial and/or directions for denial to a transaction system 208, such as in an authorization decision 434. In some embodiments, an authorization request may be denied or marked for denial, but a flag for review may be generated and/or included with the indication.

Figure 5D:
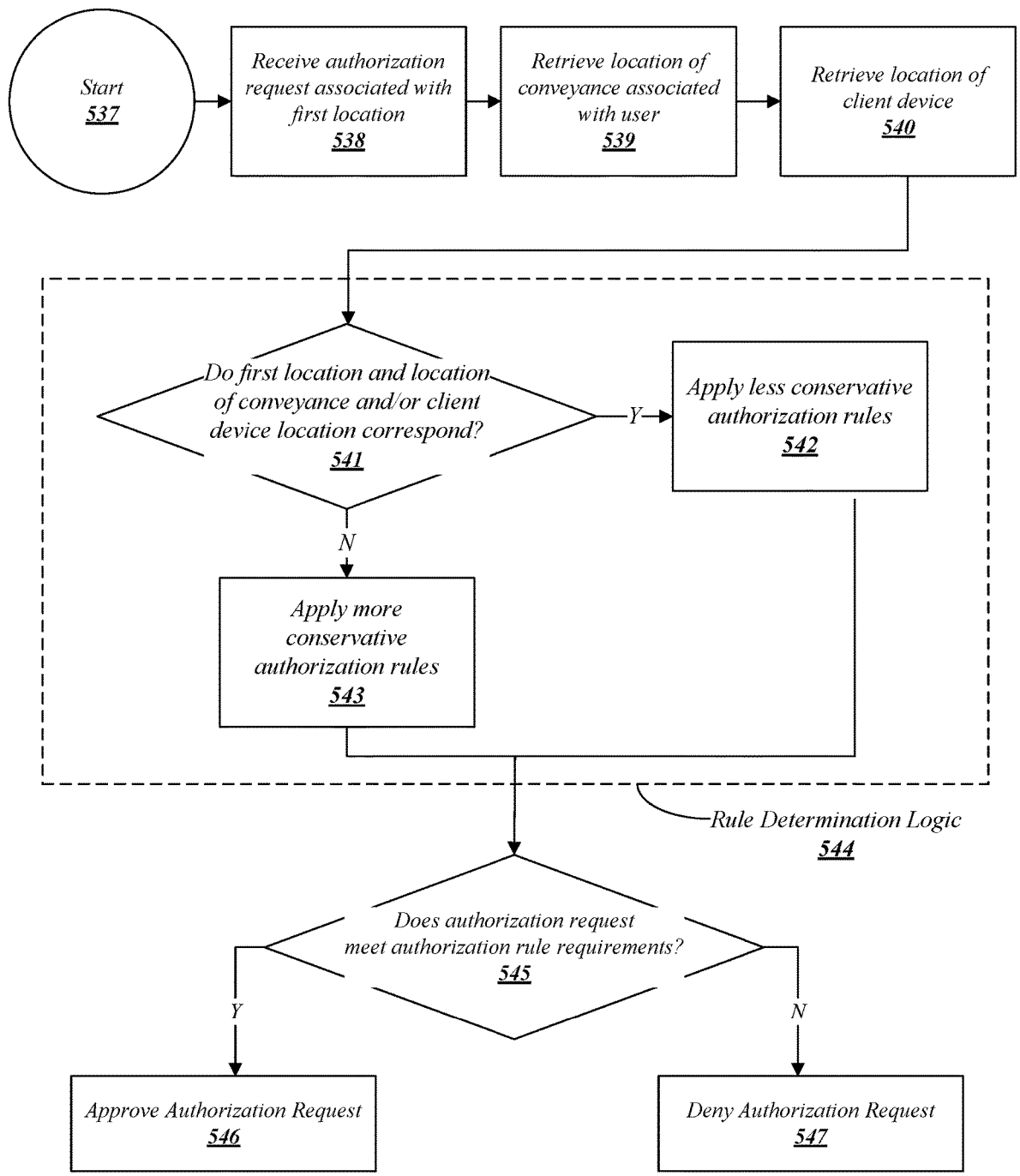

FIG. 5D illustrates exemplary aspects of a logic flow according to one or more embodiments described herein. Logic flow 500D includes logic for determining an authorization decision for a transaction according to location data received at a client device application, such as client device application 204. For example, an authorization decision may comprise aspects of authorization directions 226 and/or authorization decision 434. A logic flow may comprise one or more aspects of 500D. Embodiments are not limited in this context.

A logic flow may begin at block 537. At block 538, a system may receive an authorization request associated with a first location. In some embodiments, the authorization request of block 538 may be an authorization request 410. One or more components of a payment server 206, such as location request manager 404, request processing component 426, and/or location request manager 444 may perform logic of block 538. From block 538, logic may proceed to block 539.

At block 539, a location of conveyance associated with the user may be retrieved. In various embodiments, a location of conveyance may be associated with the position of a user and/or movement of a user. For example, a location of conveyance may indicate a drop-off location associated with the user's use of a transportation service. In some embodiments, a location of conveyance may be retrieved from a transportation service datastore 302. For example, information from emails or the location of conveyance may be retrieved from an email inbox as pertaining to the transportation service, in accordance with provided authorization from the user to access the email account. For example, the location of conveyance may be retrieved from an emailed receipt. In some embodiments, the one or more aspects of the location of conveyance may be estimated or extrapolated, as described herein.

From block 539, logic may proceed to block 540. At block 540, a location of a client device may be retrieved. For example, location information may be retrieved by a client device application 204, such as via a location request 218 or a location request 316. In some embodiments, the client device may be a mobile phone 136. In some embodiments, location may be retrieved from a location service, such as location service 202. While logic flow 500D illustrates retrieval of the location of one client device for simplicity, a location of one or more additional client devices may be retrieved at this step, as described with respect to FIG. 4A and FIG. 4B.

Logic of block 538, block 539, and block 540 may be performed concurrently or one after the other. Logic of block 538, block 539, and block 540 may be performed in any order. When logic steps of block 538, block 539, and block 540 have been completed, the logic flow may continue to block 541.

At block 541, logic may determine whether one or more locations provided by block 538, block 539, and block 540 correspond. Specifically, logic may determine whether the first location associated with the authorization request corresponds with the location of conveyance and/or retrieved client device location. Correspondence may be determined, in some embodiments, by at least partial overlap of one or more predetermined and/or calculated ranges, as described herein. In various embodiments, a location request manager 404 and/or a location request manager 444 may perform logic of block 541.

If, at block 541, one or more locations are determined to correspond, the logic may proceed to block 542. At block 542, logic may apply less conservative fraud rules. In various embodiments, application of less conservative authorization may comprise selecting at least one alternative fraud rule, such as from alternative rules 424, instead of at least one rule from a default rule set 422, wherein the at least one alternative rule has a lower security threshold than the at least one default rule. In embodiments, rules may be associated with security scores.

If, at block 541, one or more locations are not determined to correspond, the logic may proceed to block 543. At block 543, logic may apply more conservative fraud rules. In various embodiments, application of more conservative fraud rules may comprise selecting at least one alternative fraud rule, such as from alternative rules 424, instead of at least one rule from a default rule set 422, wherein the at least one alternative rule has a higher security threshold than the at least one default rule. In embodiments, rules may be associated with security scores.

In various embodiments, logic of block 541, block 542, and block 543 may be comprised by rule determination logic 544. A rule engine 418 may perform one or more aspects of rule determination logic 544.

Regarding aspects of rule determination logic 544, block 542 and block 543 are alternative logic paths. However, in some embodiments, a data flow may engage with both block 542 and block 543 within the same use case. For example, block 542 and block 543 may be performed in parallel or in series.

From block 542 and/or block 543, logic may proceed to block 545. At block 545, embodiments may determine whether an authorization request meets authorization requirements. In many embodiments, the authorization request may be the authorization request of block 538. The authorization request may be authorization request 410. Authorization requirements may be determined by rules selected by aspects of rule determination logic 544.

If, at block 545, logic determines that an authorization request meets authorization requirements, logic may proceed to block 546. At block 546, logic may approve an authorization request, such as authorization request 410. In some embodiments, a payment server 206 may approve an authorization request. In some embodiments, a payment server 206 may send an indication of approval and/or directions for approval to a transaction system 208, such as in an authorization decision 434. In some embodiments, an authorization request may be approved or marked for approval, but a flag for review may be included in the indication.

If, at block 545, logic determines that an authorization request does not meet authorization requirements, logic may proceed to block 547. At block 547, logic may deny an authorization request, such as authorization request 410. In some embodiments, a payment server 206 may deny an authorization request or send an indication of denial and/or directions for denial to a transaction system 208. In examples, an authorization decision 434 may include an indication of denial for a transaction. In some embodiments, an authorization request may be denied or marked for denial, but a flag for review may be generated and/or included with the indication.

Figure 6:
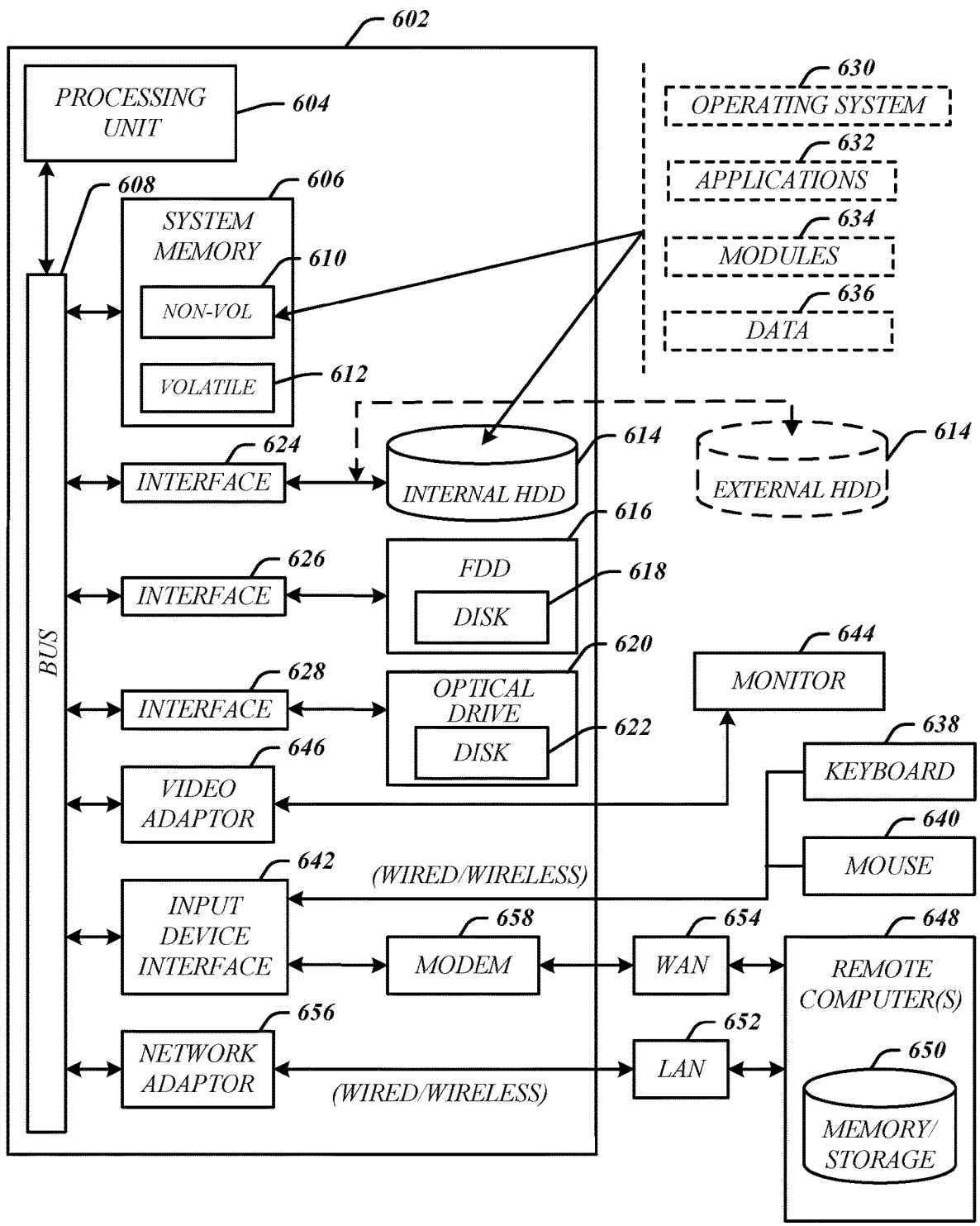
FIG. 6 is a block diagram depicting an exemplary computing architecture suitable for use with the techniques described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more of a location service 202, client device application 204, a payment server 206, a transaction system 208, a transportation service datastore 302, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bidirectional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but they can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more migrations may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
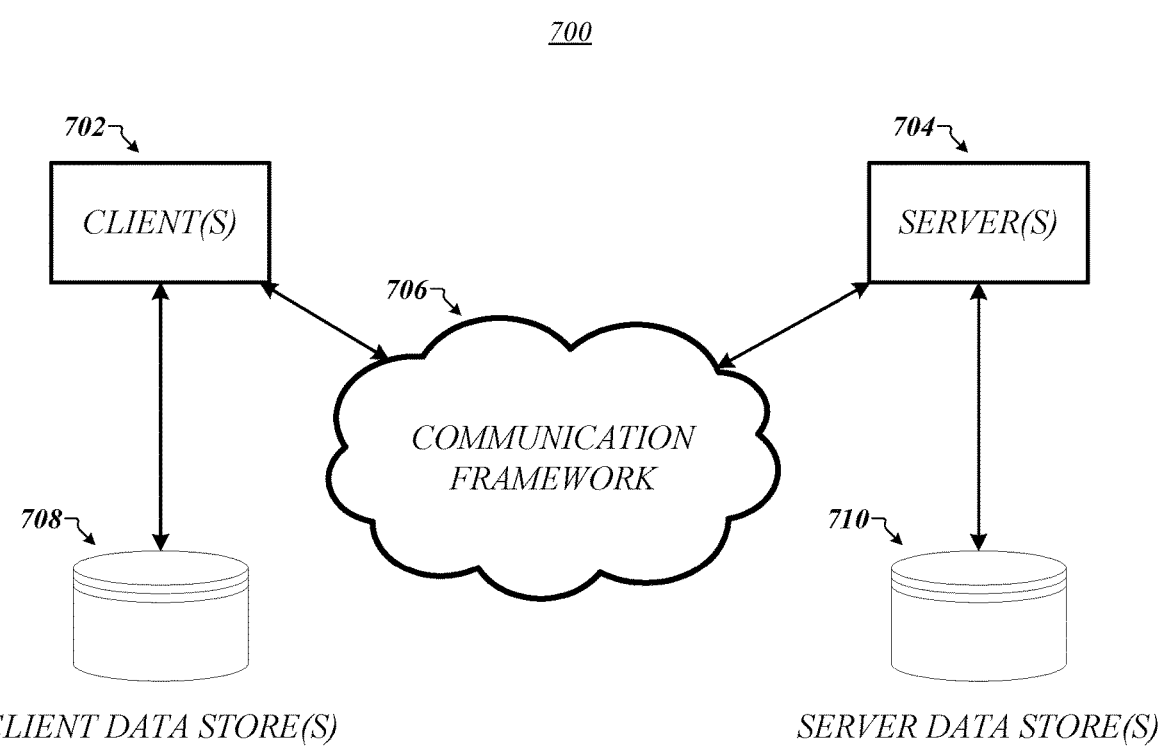
FIG. 7 is a block diagram depicting an exemplary communications architecture suitable for use with the techniques described herein.

FIG. 7 illustrates a block diagram of an exemplary communications architecture 700 suitable for implementing various embodiments as previously described, such as communication between a client device application 204 and a payment server 206. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. For example, a machine-readable medium may be a non-transitory computer-readable medium. Such representations, known as "IP cores" may be stored on a tangible, machine readable medium and supplied to various users or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An apparatus comprising:
a network interface;
a non-transitory computer-readable medium storing a set of transaction approval rules;
a hardware processor circuit; and
transaction logic executable on the hardware processor circuit and configured to cause the hardware processor circuit to:
periodically receive, at a server and via the network interface, a location of a conveyance associated with a user;
receive, at the server and via the network interface, a request to approve a first transaction received from a transaction system associated with a first merchant at a first location;
whitelist, at the server, a list of merchants with locations associated with the location of the conveyance associated with the user;
determine, at the server, whether the first merchant is whitelisted, wherein the first merchant is whitelisted when the first merchant is included in the list of merchants;
apply, at the server, the set of transaction approval rules to the request to approve the first transaction, wherein when the the first merchant is not whitelisted, more conservative ones of the set of transaction approval rules are applied, wherein when the first merchant is whitelisted, less conservative ones of the set of transaction approval rules are applied, and wherein the more conservative ones of the set of transaction approval rules are more likely than the less conservative ones of the set of transaction approval rules to deny a transaction request or request an express user approval of the transaction request;
approve or deny, at the server, the request to approve the first transaction based on the more conservative ones of the set of transaction approval rules when the first merchant is not whitelisted or the less conservative ones of the set of transaction approval rules when the first merchant is whitelisted; and send an authorization decision from the server to the transaction system, wherein the authorization decision includes directions to approve or deny the request to approve the first transaction.

2. The apparatus of claim 1, wherein the set of transaction approval rules is in a form of a decision tree, wherein the more conservative ones of the set of transaction approval rules represent a first path through the decision tree, wherein the less conservative ones of the set of transaction approval rules represent a second path through the decision tree, and wherein the second path is different from the first path.

3. The apparatus of claim 1, wherein the transaction logic is further configured to cause the hardware processor circuit to:

determine that the conveyance is located at a home or an office of the user; and transmit a request to suspend receipt of further location updates until the conveyance is outside of the home or the office of the user.

4. The apparatus of claim 1, wherein the transaction logic is further configured to cause the hardware processor circuit to:

apply the more conservative ones of the set of transaction approval rules in response to detecting that the first transaction is an in-person transaction and that the conveyance is located at a home of the user.

5. The apparatus of claim 1, wherein the transaction logic is further configured to cause the hardware processor circuit to:

request the express user approval of the first transaction by the user when applying the more conservative ones of the set of transaction approval rules.

6. The apparatus of claim 1, wherein the transaction logic is further configured to cause the hardware processor circuit to:

track a location of a mobile device associated with the user; and apply the more conservative ones of the set of transaction approval rules when the location of the conveyance associated with the user corresponds to the first location but the location of the mobile device associated with the user fails to correspond to the first location.

7. The apparatus of claim 1, wherein the server is a payment server.

8. A non-transitory computer-readable medium storing instructions that, when executed by one or more processors, cause the one or more processors to:

periodically receive, at a server and via a network interface, a location of a conveyance associated with a user;

receive, at the server and via the network interface, a request to approve a first transaction received from a transaction system associated with a first location;

compare, at the server, the first location to the location of the conveyance associated with the user;

determine, at the server, whether the location of the conveyance associated with the user corresponds to the first location;

apply, at the server, a set of transaction approval rules to the request to approve the first transaction, wherein applying the set of transaction approval rules comprises:

when the location of the conveyance associated with the user fails to correspond to the first location, applying more conservative ones of the set of transaction approval rules; and when the location of the conveyance associated with the user corresponds to the first location, relaxing the set of transaction approval rules to apply less conservative ones of the set of transaction approval rules wherein the more conservative ones of the set of transaction approval rules are more likely than the less conservative ones of the set of transaction approval rules to deny a transaction request or request an express user approval of the transaction request;

approve or deny, at the server, the request to approve the first transaction based on the more conservative ones of the set of transaction approval rules when the location of the conveyance associated with the user fails to correspond to the first location or the less conservative ones of the set of transaction approval rules when the location of the conveyance associated with the user corresponds to the first location; and send an authorization decision from the server to the transaction system, wherein the authorization decision includes directions to approve or deny the request to approve the first transaction.

9. The medium of claim 8, wherein the set of transaction approval rules is in a form of a decision tree, wherein the more conservative ones of the set of transaction approval rules represent a first path through the decision tree, wherein the less conservative ones of the set of transaction approval rules represent a second path through the decision tree, and wherein the second path is different from the first path.

10. The medium of claim 8, wherein the instructions are further configured to cause the one or more processors to:

determine that the conveyance is located at a home or an office of the user; and transmit a request to suspend receipt of further location updates until the conveyance is outside of the home or the office of the user.

11. The medium of claim 8, wherein the instructions are further configured to cause the one or more processors to:

apply the more conservative ones of the set of transaction approval rules in response to detecting that the first transaction is an in-person transaction and that the conveyance is located at a home of the user.

12. The apparatus of claim 8, wherein the instructions are further configured to cause the one or more processors to:

request the express user approval of the first transaction by the user when applying the more conservative ones of the set of transaction approval rules.

13. The medium of claim 8, wherein the instructions are further configured to cause the one or more processors to:

track a location of a mobile device associated with the user; and apply the more conservative ones of the set of transaction approval rules when the location of the conveyance associated with the user corresponds to the first location but the location of the mobile device associated with the user fails to correspond to the first location.

14. The medium of claim 8, wherein the server is a payment server.

15. A computer-implemented method comprising:

periodically retrieving, at a server and via a network interface, data or documents from a transportation service datastore pertaining to a transportation service;

identifying, estimating, or extrapolating a location of a conveyance associated with a user from the data or the documents retrieved;

receiving, at the server and via the network interface, a request to approve a first transaction received from a transaction system associated with a first location;

comparing, at the server, the first location to the location of the conveyance associated with the user;

determining, at the server, whether the location of the conveyance associated with the user corresponds to the first location;

applying, at the server, the set of transaction approval rules to the request to approve the first transaction, wherein when the location of the conveyance associated with the user fails to correspond to the first location, more conservative ones of the set of transaction approval rules are applied, wherein when the location of the conveyance associated with the user corresponds to the first location, less conservative ones of the set of transaction approval rules are applied, and wherein the more conservative ones of the set of transaction approval rules are more likely than the less conservative ones of the set of transaction approval rules to deny a transaction request or request an express user approval of the transaction request;

approving or denying, at the server, the request to approve the first transaction based on the more conservative ones of the set of transaction approval rules when the location of the conveyance associated with the user fails to correspond to the first location or the less conservative ones of the set of transaction approval rules when the location of the conveyance associated with the user corresponds to the first location; and sending an authorization decision from the server to the transaction system, wherein the authorization decision includes directions to approve or deny the request to approve the first transaction.

16. The method of claim 15, wherein the set of transaction approval rules is in a form of a decision tree, wherein the more conservative ones of the set of transaction approval rules represent a first path through the decision tree, wherein the less conservative ones of the set of transaction approval rules represent a second path through the decision tree, and wherein the second path is different from the first path.

17. The method of claim 15, further comprising:

determining that the conveyance is located at a home or an office of the user; and transmitting a request to suspend receipt of further location updates until the conveyance is outside of the home or the office of the user.

18. The method of claim 15, further comprising:

applying the more conservative ones of the set of transaction approval rules in response to detecting that the first transaction is an in-person transaction and that the conveyance is located at a home of the user.

19. The method of claim 15, further comprising:

requesting the express user approval of the first transaction by the user when applying the more conservative ones of the set of transaction approval rules.

20. The method of claim 15, further comprising:

tracking a location of a mobile device associated with the user; and applying the more conservative ones of the set of transaction approval rules when the location of the conveyance associated with the user corresponds to the first location but the location of the mobile device associated with the user fails to correspond to the first location.

* * * * *